United States Patent
Drucker et al.

(10) Patent No.: US 7,853,886 B2
(45) Date of Patent: Dec. 14, 2010

(54) PERSISTENT SPATIAL COLLABORATION

(75) Inventors: Steven M. Drucker, Bellevue, WA (US);
Aamer Hydrie, Seattle, WA (US);
Li-wei He, Redmond, WA (US); Rajesh K. Hegde, Redmond, WA (US);
Zhengyou Zhang, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 410 days.

(21) Appl. No.: 11/711,314

(22) Filed: Feb. 27, 2007

(65) Prior Publication Data
US 2008/0209327 A1 Aug. 28, 2008

(51) Int. Cl.
*G06F 3/00* (2006.01)

(52) U.S. Cl. .......... 715/759; 715/751; 715/741

(58) Field of Classification Search .......... 715/751, 715/759, 741
See application file for complete search history.

(56) References Cited

U.S. PATENT DOCUMENTS

| | | | |
|---|---|---|---|
| 5,337,407 A * | 8/1994 | Bates et al. .......... 715/751 |
| 6,134,549 A * | 10/2000 | Regnier et al. .......... 707/9 |
| 6,292,188 B1 | 9/2001 | Carlson et al. |
| 6,342,906 B1 * | 1/2002 | Kumar et al. .......... 715/751 |
| 6,360,250 B1 | 3/2002 | Anupam et al. |
| 6,687,878 B1 | 2/2004 | Eintracht et al. |
| 7,007,235 B1 * | 2/2006 | Hussein et al. .......... 715/751 |
| 7,149,776 B1 | 12/2006 | Roy et al. |
| 2002/0016788 A1 | 2/2002 | Burridge |
| 2002/0046245 A1 | 4/2002 | Hillar et al. |
| 2003/0204490 A1 | 10/2003 | Kasriel |
| 2004/0021686 A1 | 2/2004 | Barberis |
| 2004/0133639 A1 | 7/2004 | Shuang et al. |
| 2005/0086188 A1 | 4/2005 | Hillis et al. |
| 2005/0262095 A1 | 11/2005 | Beartusk et al. |
| 2006/0235984 A1 | 10/2006 | Kraus et al. |

OTHER PUBLICATIONS

Dillenbourg, et al., "Why spatial metaphors are relevant to virtual campuses?", http://tecfa.unige.ch/tecfa/publicat/dil-papers-2/Dil.7.1.15.pdf.

(Continued)

*Primary Examiner*—Dennis Bonshock
(74) *Attorney, Agent, or Firm*—Capitol City TechLaw; Richard C. Irving

(57) ABSTRACT

Persistent, spatial collaboration on the web supports a free-form, user-intuitive approach to a variety of projects and activities. Users can place differing object types at any time any where on a web page and/or the system can automatically, and with no user effort, affect object placement based on one or more meta data characteristics. A user can, in real-time, see changes made by another user to a web page, and, if desired, react accordingly, enabling true collaboration even if the various users are at remote locations. The flexibility of the methodology and system provides a platform for users to engage in projects and activities in a manner and environment suited to the users' mind sets, creativity, and natural proclivities.

20 Claims, 17 Drawing Sheets

OTHER PUBLICATIONS

Girgensohn, et al., "Experiences in Developing Collaborative Applications Using the World Wide Web "Shell"", Date: 1996, http://www.webcollab.com/alee/papers/htext96.pdf.

Graham, et al., "A World-Wide-Web Architecture for Collaborative Software Design", http://stl.cs.queensu.ca/~graham/stl/pubs/step99.pdf.

Marshall, et al., "VIKI: Spatial Hypertext Supporting Emergent Structure", Date: Sep. 1994, http://typhon.perseus.tufts.edu/typhon/Flashy/Documents/Documents.current/DL%20Notes/marshall.ht.99.pdf.

Written Opinion of the International Searching Authority and International Search Report for PCT/US2008/054838, mailed Jul. 17, 2008.

Robertson, George et al., "Data Mountain: Using Spatial Memory for Document Management", UIST 1998.

Malone, Thomas W., "How Do People Organize Their Desks? Implications for the Design of Office Information Systems", ACM Transactions on Office Information Systems, vol. 1, No. 1, Jan. 1983, pp. 99-112.

Whittaker, Steve et al., "The Character, Value, and Management of Personal Paper Archives", ACM Transactions on Computer-Human Interaction, vol. 8, No. 2, Jun. 2001, pp. 150-170.

Bauer, Danial et al., "Computationally-Enriched 'Piles' for Managing Digital Photo Collections", Proceedings of the 2004 IEEE Symposium on Visual Languages and Human Centric Computing, pp. 193-195, Sep. 26-29, 2004.

Bauer, Daniel et al., "Spatial Tools for Managing Personal Information Collections", Proceedings of the 38th Annual Hawaii International Conference on System Sciences, Jan. 2005.

Bederson, Benjamin B. et al., "Pad++: A Zooming Graphical Interface for Exploring Alternate Interface Physics", UIST 1994.

Bederson, Benjamin B. et al., "Pad++: A Zoomable Graphical Interface for Exploring Alternate Interface Physics", Journal of Visual Languages and Computing, 1995.

Agrawala, Anand et al., "Keepin' It Real: Pushing the Desktop Metaphor with Physics, Piles and the Pen", Proceedings of CHI, Apr. 22-27, 2006, pp. 1283-1292.

* cited by examiner

PERSISTENT SPATIAL COLLABORATION

BACKGROUND

In our increasingly technologically-based society, people are communicating and collaborating with each other using their computers and computer-based devices (e.g., BLACKBERRY® hand-held devices, computer-based cell phones, etc.), collectively referred to herein as computing devices. And as people situated in remote locations from each other desire to work collaboratively, there is increasingly an interest in effective and efficient mechanisms to use, share, create and view relevant information simultaneously and also asynchronously. Thus it would be advantageous to support computing device users by providing and supporting a persistent shared environment for the users to, in an intuitive, user-friendly, manner, create, share and collaborate on relevant information.

A wiki is a known type of website that allows users to share and edit content hosted on the website. Wikis, however, are primarily textual in nature. Moreover, wikis are generally awkward to format. Additionally, wikis are document-based, and thus, rely on, and are restricted to, the flow of the document to organize and present user information.

There are also various photo-oriented websites that allow users to share, and in some cases, collaborative, on photo displays. However, existing photo-oriented websites are, as their title suggests, geared towards photo display and editing, and thus have limited usages. Moreover, known photo-oriented websites use grid-based layout schemes which do not allow for free-form layout or easy customization.

There are a multitude of scenarios in which various computing device users could beneficially employ an easily-accessible, persistent, collaborative format, such as, but not limited to, working on development projects, sharing thoughts on purchase choices, e.g., home, furniture or landscape options, collaborating on scrapbook page designs, designing a presentation, writing and illustrating a story, developing a map, creating an electronic journal, etc.

SUMMARY

This summary is provided to introduce a selection of concepts in a simplified form that are further described below in the Detailed Description. This summary is not intended to identify key or essential features of the claimed subject matter, nor is it intended to be used as an aid in determining the scope of the claimed subject matter.

Embodiments discussed herein include technology that provides for persistent, spatial-based projects/activities and/or collaboration on one or more web pages hosted on the internet.

In an embodiment a persistent spatial collaboration system is implemented to allow one or more users to work, and collaborate, on a web page in a user-intuitive free-form style, with no object characteristic boundaries.

In an aspect of an embodiment a user can access a web page and render one or more changes to the web page, e.g., add an object, modify an object, etc., unhampered by any spatial boundaries affecting object placement based on the object type and/or other object characteristics. In an aspect of an embodiment changes made to a web page by one user can be viewed by, and reacted to, in real-time by other users currently accessing the same web page.

BRIEF DESCRIPTION OF THE DRAWINGS

These and other features will now be described with reference to the drawings of certain embodiments and examples which are intended to illustrate and not to limit the invention, and in which.

DETAILED DESCRIPTION

In the following description, for purposes of explanation, numerous specific details are set forth in order to provide a thorough understanding of the present invention. It will be apparent, however, to one skilled in the art that the invention may be practiced without these specific details. In other instances, well-known structures and devices are shown in block diagram form in order to avoid unnecessarily obscuring the invention. Any and all titles used throughout are for ease of explanation only and are not for use in limiting the invention.

Figure 1:
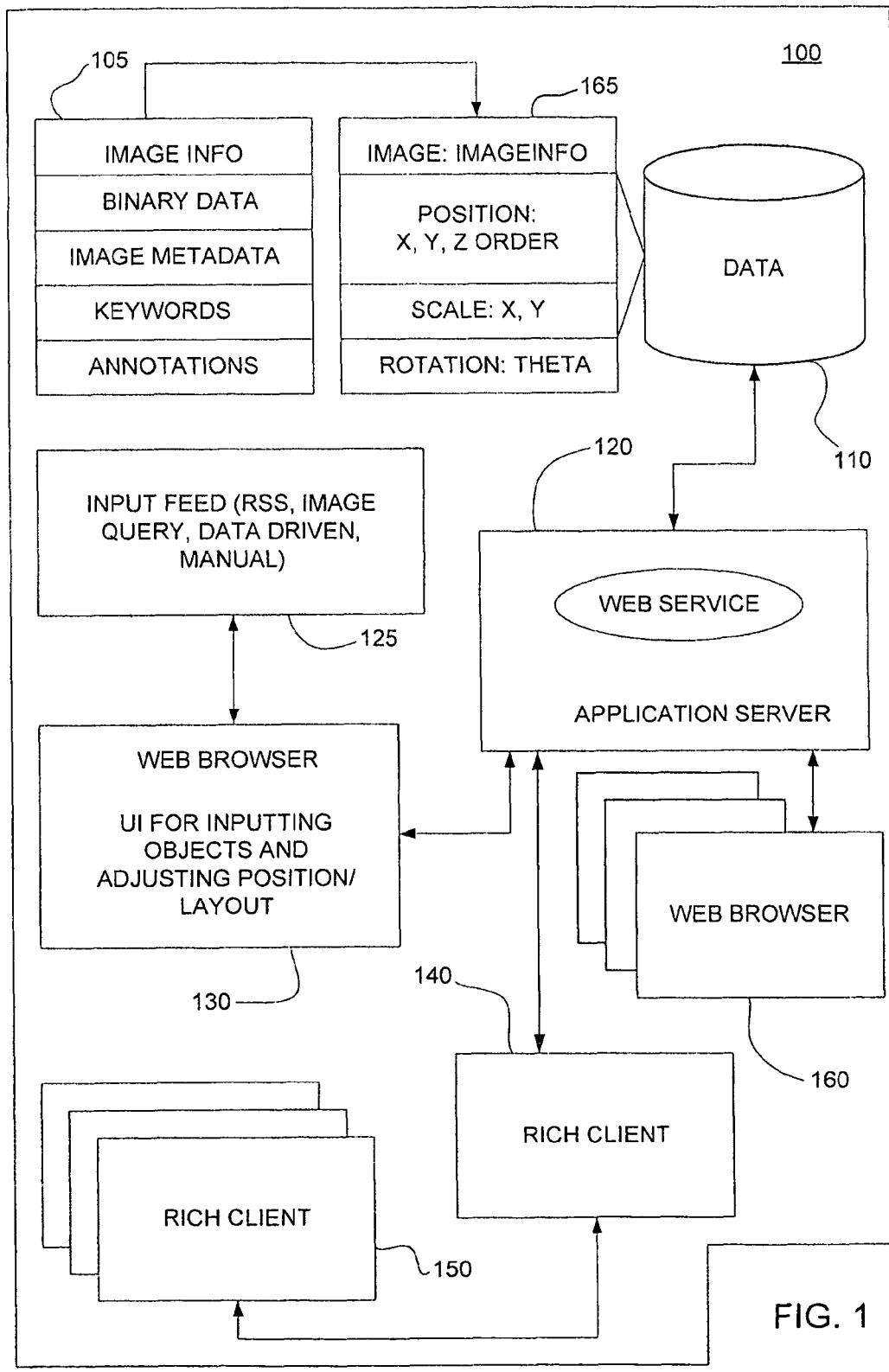
FIG. 1 is an embodiment persistent spatial collaboration system.

An embodiment persistent spatial collaboration system 100, depicted in FIG. 1, uses a spatial layout metaphor for generating, modifying, sharing, collaborating on and persisting a spatial-based webpage among one or more computing device users. In an embodiment the persistent spatial collaboration system 100, also referred to herein as a PSC system 100, uses a two-dimensional canvas, or pasteboard, or whiteboard, metaphor, to provide easy addition, placement and arrangement of text, images, audio/visual, and audio, collectively referred to as objects, on one or more web pages. Computing device users, also referred to herein simply as users, can add or delete objects, move, scale, orient, modify and view objects on a web page. New web pages can be linked to existing web pages in the embodiment PSC system 100. In an embodiment automated actions, e.g., placement, deletion, modification, extraction, etc., are performed on objects based on object characteristics and/or properties.

The embodiment PSC system 100 is compelling because it is a platform for a diverse number of user and user-collaborative activities. In an embodiment the PSC system 100 is not limited to a text-flow based metaphor, and thus, supports any task that employs a spatial arrangement metaphor, much in the way that users currently employ existing whiteboards.

As shown in FIG. 1, in an embodiment information/properties 105 on objects added to a web page in the PSC system 100 are stored as various characteristics 165 in a database 110 that is accessible by a web service application server 120. In an embodiment the web service application server 120 supports a programmatic API (application programming interface) for enabling web page layout.

In the embodiment PSC system 100 a web browser 130 interacts with the web service application server 120 and provides a user interface (UI) for a user to view, add, delete, modify, etc. objects on a web page supported by the PSC system 100. In an embodiment the web browser 130 can receive one or more of a variety of input feeds 125, including RSS, i.e., a family of web feed formats used to publish updates to a website, image queries, user manual inputs, database driven inputs, etc. The utilization of a web browser 130 for providing a UI for a user to view, add, delete, modify, etc. objects on a web page supported by the PSC system 100 allows the user to work on such a web page without the need to make any additional installations, e.g., program installs, on their computing device.

In the embodiment PSC system 100 the web browser 130 and the web service application server 120 communicate to generate and maintain the layout of a web page. In an aspect of this embodiment the web browser 130 and the web service application server 120 use a combination of XML® and JAVASCRIPT® to communicate information about the supported web page(s). In an alternate aspect of this embodiment the web browser 130 and the web service application server 120 use a combination of JSON (Javascript Object Notation) and JAVASCRIPT® to communicate information about the supported web page(s). In still other alternative aspects of this embodiment the web browser 130 and the web service application server 120 employ other data transport protocols for communicating information about the supported web page(s).

In an embodiment PSC system 100 one or more other web browsers 160 can communicate with the web service application server 120 for enabling user shared viewing and collaboration on one or more various web pages.

In an embodiment a PSC system 100 also supports a rich client 140 hosted on a user computing device for generating, modifying, sharing, collaborating on and persisting a spatial-based web page among one or more computing device users. In an embodiment the rich client 140 communicates with the web service application server 120 to generate and maintain the layout of a web page. In an aspect of this embodiment the rich client 140 and the web service application server 120 communicate using a combination of XML® and rich client-supported applications/languages to share information about the supported web page(s). In other alternative aspects of this embodiment the rich client 140 and the web service application server 120 use other data transport protocols to enable sharing information about a supported web page(s).

In an embodiment PSC system 100 a supported rich client 140 can communicate with one or more other rich clients 150 hosted on the user's or other users' computing devices for enabling shared viewing and collaboration on one or more various web pages. In an aspect of this embodiment peer-to-peer connections are established for the rich client 140 and the one or more other rich clients 150 to enable real time computing for the rich client 140 and rich client(s) 150.

Figure 2A:
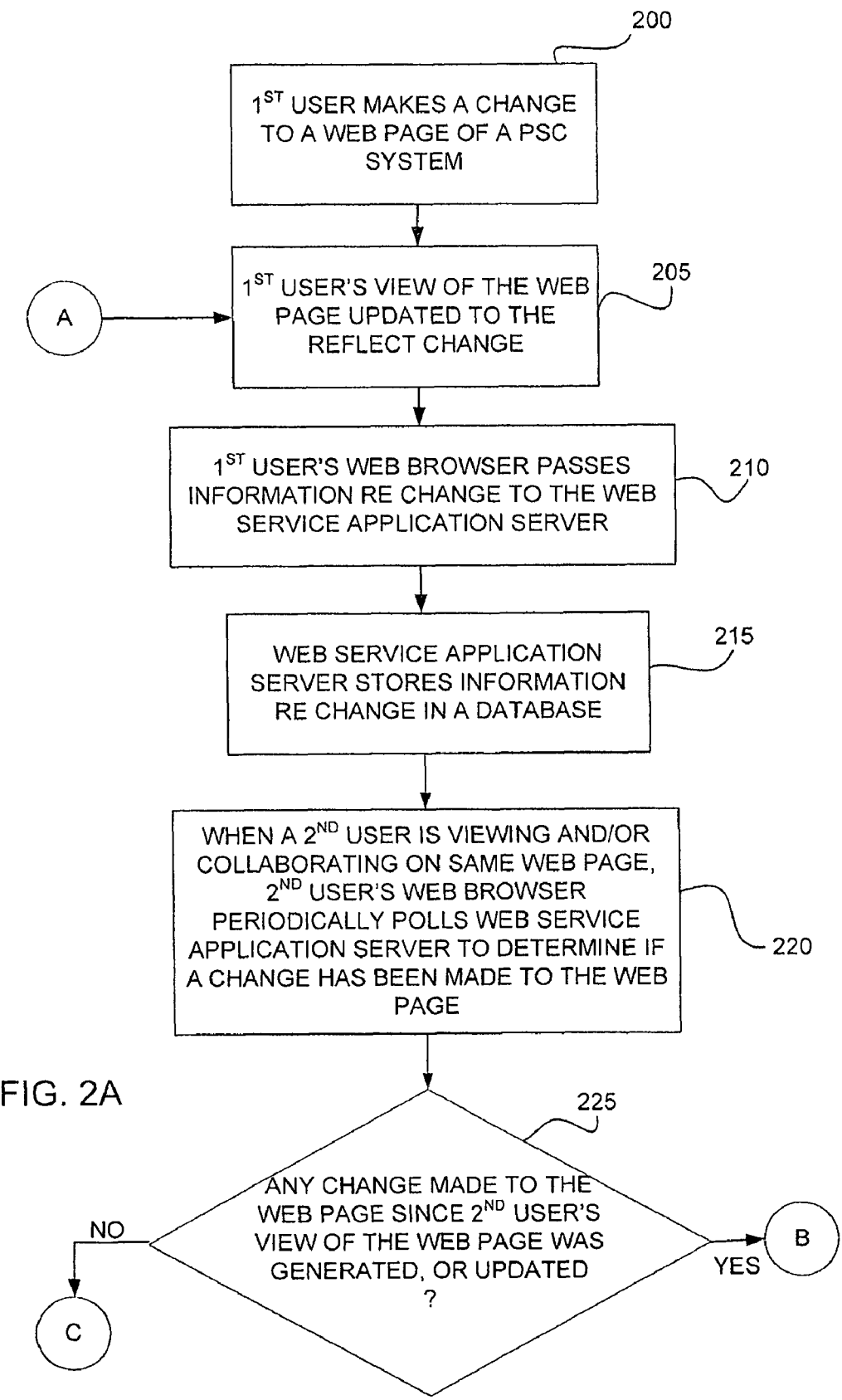
FIGS. 2A, 2B and 2C illustrate an embodiment general logic flow for supporting real-time collaboration in an embodiment persistent spatial collaboration system.
Figure 2B:
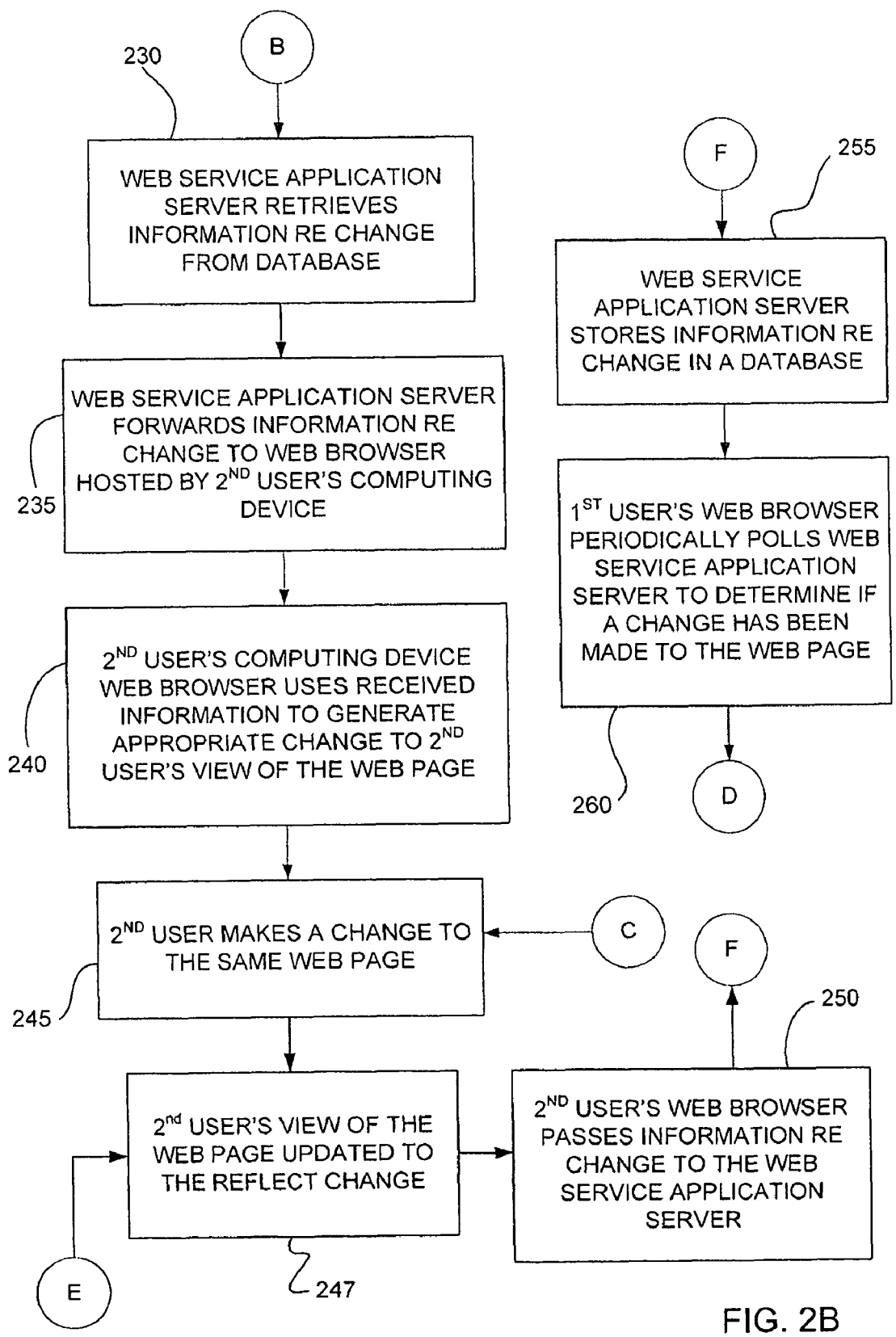
Figure 2C:
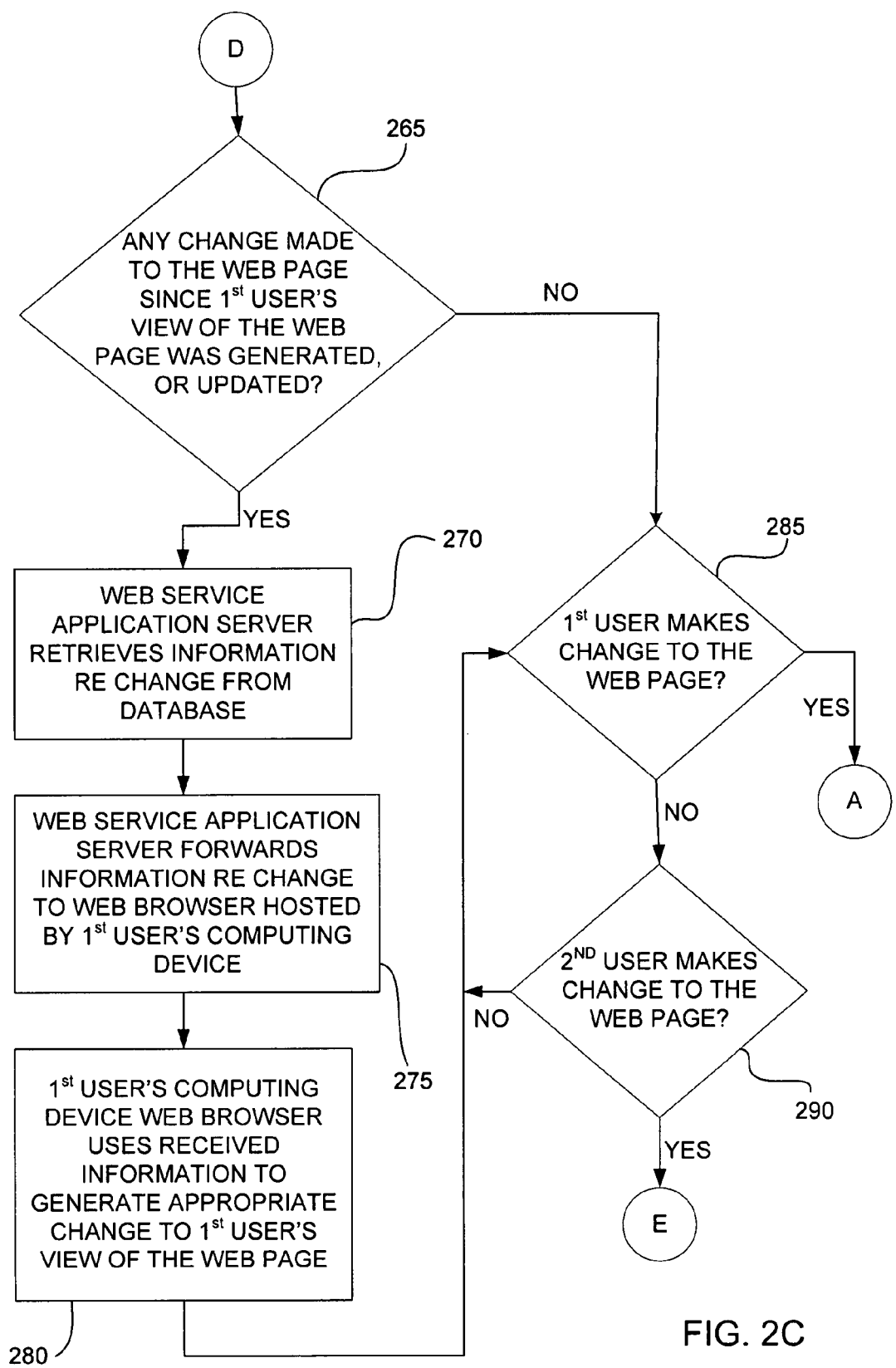

FIGS. 2A, 2B and 2C illustrate an embodiment logic flow for a methodology for a polling technique used to support web-based persistent, spatial collaboration. While the following discussion is made with respect to systems portrayed herein, the operations described may be implemented in other systems. Further, the operations described herein are not limited to the order shown. Additionally, in other alternative embodiments more or fewer operations may be performed.

Referring to FIG. 2A, in an embodiment, when a first user makes a change to a web page of a PSC system 200 the first user's view of the web page is updated to reflect the change 205. In an embodiment the first user's computing device web browser passes information regarding the change to the web service application server 210. In an embodiment the web service application server in turn stores information regarding the change in a related database 215. In an embodiment, when a second user is viewing and/or collaborating on the same web page, the second user's computing device web browser periodically polls the web service application server for any changes made to the web page since the second user accessed the web page or their web browser polled for changes to the web page 220. At decision block 225 the web service application server makes a determination as to whether there has been a change made to the web page since the second user's view of the web page was generated, or updated.

If there has been a change, as shown in FIG. 2B, in an embodiment the web service application server retrieves the necessary information stored in the database for rendering the change 230 and forwards the information to the web browser hosted by the second user's computing device 235. The second user's computing device web browser uses the forwarded information to generate the appropriate change to the second user's view of the same web page 240.

In an embodiment the second user can also make changes to the collaborative web page 245. Upon the second user making a change to the web page, in an embodiment the second user's view of the web page is updated to reflect the change 247. In an embodiment the second user's computing device web browser passes information regarding the change to the web service application server 250. In an embodiment the web service application server in turn stores information regarding the change in a related database 255. The first user's computing device web browser periodically polls the web service application server for any changes made to the web page since the first user accessed the web page or their web browser last polled for changes to the web page 260.

Referring to FIG. 2C, at decision block 265 the web service application server makes a determination as to whether there has been any change made to the web page since the first user's view of the web page was generated, or last updated. If there has been a change, in an embodiment the web service application server retrieves the necessary information stored in the database for rendering the change 270 and forwards the information to the web browser hosted by the first user's computing device 275. The first user's computing device web browser uses the forwarded information to generate the appropriate change to the first user's view of the same web page 280.

At decision block 285 a determination is made as to whether the first user has made a change to the web page. If yes, as shown in FIG. 2A, the first user's view of the web page is updated to reflect the change 205 and the first user's computing device web browser passes information regarding the change to the web service application server 210 which, in turn, stores information regarding the change in a related database 215.

If at decision block 285 a determination is made that the first user has not made a change to the web page, then, at decision block 290 a determination is made as to whether the second user has made a change to the web page. If yes, as shown in FIG. 2B, the second user's view of the web page is updated to reflect the change 247 and the second user's computing device web browser passes information regarding the change to the web service application server 250 which, in turn, stores information regarding the change in a related database 255.

The simplified flow of this process continues with each user capable of making changes to the collaborative web page and each user's web browser periodically polling the web service application server to determine if a change has been rendered to the collaborative web page.

Figure 3:
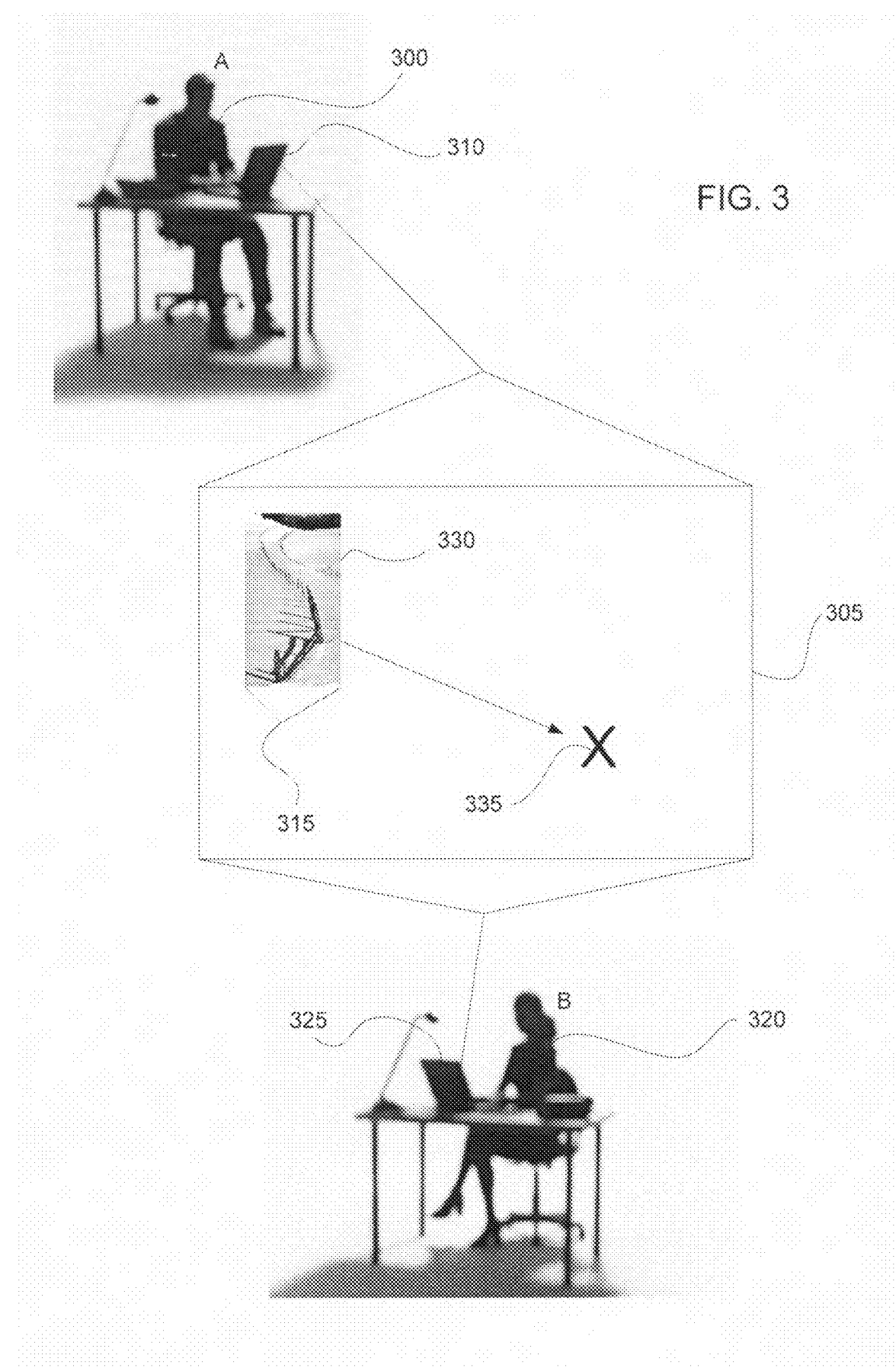
FIG. 3 depicts an exemplary real-time collaboration scenario on a web page supported by an embodiment persistent collaboration system.

Thus, for example, and referring to FIG. 3, assume a first user, A 300, is working on a spatial web page 305 supported by a PSC system 100 via their computing device 310. Also assume user A 300 has placed, or otherwise positioned, an image, i.e., picture, 315 on the web page 305, at a first position 330. If a second user, B 320, accesses, or otherwise loads, the web page 305 via the web browser hosted by their computing device 325, user B 320 will see the picture 315 as placed on the web page 305 by user A 300 in position 330.

Now assume that user A 300 moves the picture 315 from its original, first position 330 to a second position 335 on the web page 305. In an embodiment user B 320 sees the picture 315 move on the web page 305 on user B's computing device 325 display from its first position 330 to its second position 335.

In an embodiment the PSC system 100 provides for this real-time property-sharing of objects hosted on the exemplary web page 305 between user A 300 and user B 320 by having the web browser 160 hosted by user B's computing device 325 poll the web service application server 120 periodically to retrieve any changes made to the web page 305 since its view was last generated, or updated, on user B's computing device 325 display.

In an embodiment, to support real-time viewing and web page collaboration only changes to a currently shared web page are propagated via the polling technique discussed with reference to FIGS. 2A through 2C to simultaneously collaborating, i.e., viewing and/or working on, the web page. In this manner the entire web page need not be refreshed on each collaborating user's computing device display every time a change to the web page is generated by any one collaborating user.

In an embodiment there can be one user accessing, i.e., viewing and/or editing, a web page supported by the PSC system 100, two users simultaneously accessing a collaborative web page supported by the PSC system 100 as exemplified in the processing flow of FIGS. 2A through 2C, or more than two users simultaneously accessing a collaborative web page. If there are two or more users simultaneously accessing a collaborative web page, in an embodiment each user's computing device web browser periodically polls the web service application server 120 to determine if a change has been rendered to the web page since the respective user's view of the web page was generated, or last updated.

In an embodiment, if a user's computing device is using a rich client 140 to collaborate, i.e., view and/or work on, a web page supported by a PSC system 100, the rich client 140 also uses the polling technique discussed with reference to FIGS. 2A through 2C to access any changes made to the web page since it was last updated on the user's computing device display. Thus, referring again to FIGS. 2A through 2C, in this embodiment when a first user makes a change to a web page of a PSC system 205 the rich client processing on the user's computing device passes information regarding the change to the web service application server 210. In an embodiment the web service application server in turn stores information regarding the change in a related database 215. In an embodiment, when a second user is simultaneously collaborating on the same web page, the rich client processing on the second user's computing device periodically polls the web service application server for any changes made to the web page since the second user accessed the web page or the rich client processing on the second user's computing device polled for changes to the web page 220. At decision block 225 a determination is made as to whether a change has been made to the web page since the second user's view of the web page was generated, or updated.

If there has been such a change, in an embodiment the web service application server retrieves the necessary information stored in the database for generating the changes 230 and forwards the information to the rich client processing on the second user's computing device 235. The rich client processing on the second user's computing device uses the forwarded information to render appropriate changes to the second user's view of the same web page 240.

In an embodiment, a second user's computing device can also use a rich client 150 to collaborate, i.e., view and/or work on, the same web page. In an embodiment the second user can also make changes to the collaborative web page 245, as indicated in FIG. 2B. Upon the second user making a change to the web page, in an embodiment the rich client processing on the second user's computing device passes information regarding the change to the web service application server 250 which, in turn, stores information regarding the change in a related database 255. The rich client processing on the first user's computing device periodically polls the web service application server for any changes made to the web page since the first user accessed the web page or the rich client processing on their computing device last polled for changes to the web page 260.

In this embodiment, and as shown in FIG. 2C, at decision block 265 the web service application server makes a determination as to whether there has been any change made to the web page since the first user's view of the web page was generated, or last updated. If there has been a change, in an embodiment the web service application server retrieves the necessary information stored in the database for rendering the change 270 and forwards the information to the rich client processing on the first user's computing device 275. The rich client processing on the first user's computing device uses the forwarded information to generate the appropriate change to the first user's view of the same web page 280.

At decision block 285 a determination is made as to whether the first user has made a change to the web page. If yes, in this embodiment, and as shown in FIG. 2A, the rich client processing on the first user's computing device passes information regarding the change to the web service application server 210 which, in turn, stores information regarding the change in a related database 215.

If at decision block 285 a determination is made that the first user has not made a change to the web page, then, at decision block 290 a determination is made as to whether the second user has made a change to the web page. If yes, in this embodiment, and as shown in FIG. 2B, the rich client processing on the second user's computing device passes information regarding the change to the web service application server 250 which, in turn, stores information regarding the change in a related database 255.

The simplified flow of this process continues with each user capable of making changes to the collaborative web page and the rich client processing on each user's computing device periodically polling the web service application server to determine if a change has been rendered to the collaborative web page.

In an alternative embodiment if two, or more, users' computing devices are running rich clients to access a collaborative web page supported by an embodiment PSC system 100, changes made by one user can be pushed to the computing devices of the other users. For example, assume user A 300 and user B 320 of FIG. 3 are both accessing the same collaborative web page 305 via rich clients processing on their respective computing devices 310 and 325. Also assume that user A 300 moves the picture 315 from its first position 330 to a second position 335. In this alternative embodiment, the rich client processing on user A's computing device 310 sends the necessary change information to the rich client processing on user B's computing device 325, negating the need for the rich client operating on the computing device 325 to poll a web service application server 120 for any changes made since the view displayed on computing device 325 was last generated, or updated. The rich client processing on user B's computing device 325 uses the change information it receives from the rich client processing on user A's computing device 310 to render the necessary change, and view, for user B 320, i.e., in the example of FIG. 3 the rich client processing on user B's computing device 325 uses the positional change information of picture 315 to display on user B's computing device picture 315 in new location 335.

In an embodiment a user accessing a collaborative web page supported by an embodiment PSC system 100 can also, and/or additionally, refresh the web page, or perform some action that causes the web page to be refreshed. In this embodiment the entire web page is redrawn on the respective user's computing device display, and the redrawn web page includes any changes made to the web page since the web page view was last updated on the user's computing device display.

Figure 4:
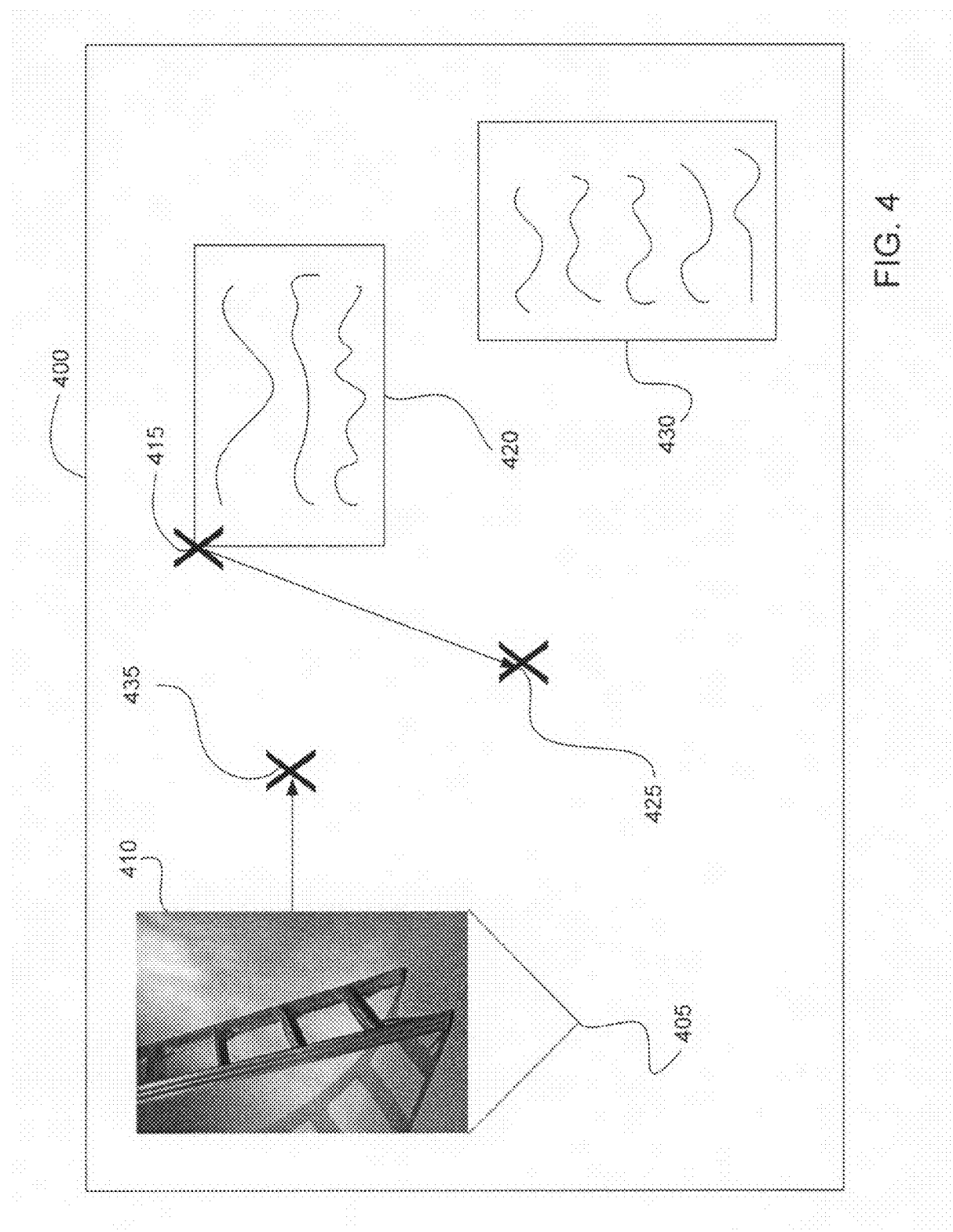
FIG. 4 depicts an exemplary collaborative web page in progress supported by an embodiment persistent collaboration system.

As noted above, an embodiment PSC system 100 uses a two-dimensional canvas, or pasteboard, or whiteboard, metaphor, to provide easy addition, placement and arrangement of objects on one or more web pages. An embodiment PSC system 100 is not limited to the traditional document flow generally used in currently known systems. Thus, for example, and referring to FIG. 4, a user can position a new picture 405 anywhere on the exemplary web page 400. The user can also add any other object, e.g., picture, text, audio, audio/visual, anywhere on the web page 400.

For example, a user can click on position 415 on the web page 400 to create a text box 420. The user can then begin to type text into the text box 420. In an embodiment the original created text box 420 is a predetermined width, with its length increasing as necessary to accommodate the user's input text. In an embodiment the user can, at any time after the text box 420 is first created, reformat the size, width and/or length of the text box 420. The user can also, at any time after the text box 420 is first created, reposition it on the web page 400, e.g., from its initial start position 415 to a new start position 425.

In an embodiment other users, with the proper authority, can reposition, modify, add, delete, etc. objects on a collaborative web page. In an embodiment, however, a second user cannot reposition, modify or delete a text box that a first user is currently working in. Thus, for example, and referring to FIG. 4, in an embodiment, if a first user is currently inputting text to text box 420, no other user with any access to the collaborative web page 400 can reposition, modify or delete text box 420 at this time. However, once the first user is finished inputting and/or modifying text in text box 420, and is no longer working in text box 420, the text box 420 becomes available to other users with the proper authority for modification, repositioning or even deleting.

Likewise, in an embodiment a second user cannot reposition, modify or delete any other object type, e.g., picture, audio, audio/visual, that a first user is currently working on a collaborative web page. In this embodiment, again however, once the first user is finished working on the object, the object then becomes available to other users with the proper authority for modification, repositioning or deleting.

In an embodiment more than one user can add, modify, reposition or delete alternative objects simultaneously on a collaborative web page. Thus, for example, a first user can be inputting text to text box 420 while a second user adds text box 430 to the same web page 400 and is inputting text to text box 430. As another example, a first user can be inputting text to text box 420 while a second user is simultaneously moving picture 405 from its original first position 410 to a second position 435 on the web page 400.

In an embodiment there is no limit to the number of users that can simultaneously collaborate on a web page supported by an embodiment PSC system 100. In an alternative embodiment a predetermined number of users can simultaneously collaborate on a web page supported by an embodiment PSC system 100.

Figure 5:
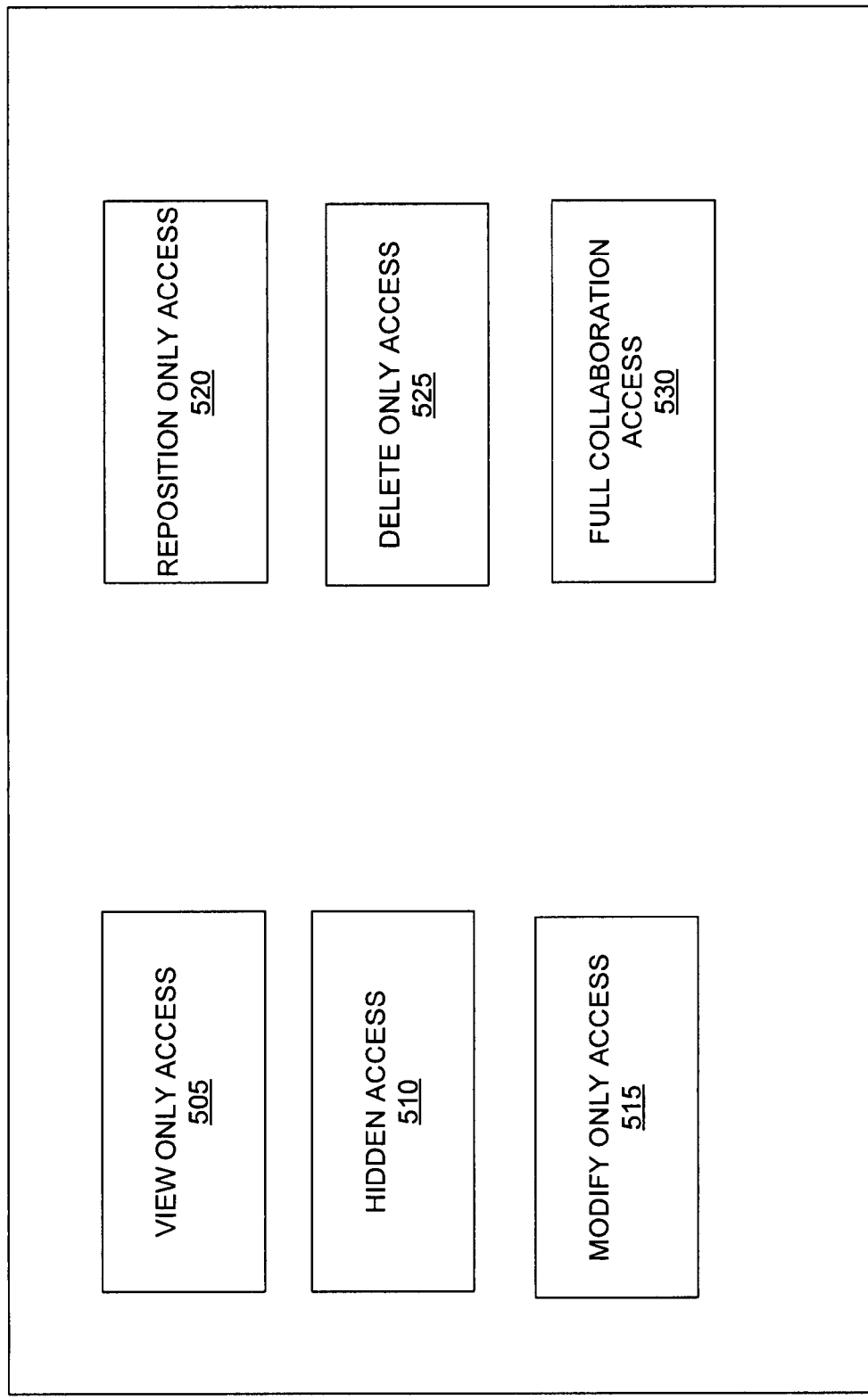
FIG. 5 depicts embodiment access levels that can be assigned objects on a collaborative web page supported by an embodiment persistent collaboration system.

In an embodiment the objects added to a web page supported by an embodiment PSC system 100 can be assigned, or otherwise designated, various access levels. FIG. 5 depicts an embodiment of various access levels 500 that can be assigned any one object on such a collaborative web page. A view only access level 505 assigned an object on a collaborative web page ensures that the object can only be viewed by users other than the user that added the object to the web page. All users other than the user that added an object with a view only access level 505 cannot modify, reposition, delete, or in any other manner affect the object on the web page. The user that originally added the object to the web page, however, can modify, reposition or delete an object with a view only access level 505.

A hidden access level 510 assigned to an object on a collaborative web page causes the object to be hidden, i.e., not displayed, to any user of the collaborative web page other than the user that added the object to the web page. In an embodiment, if a second user tries to add or reposition a second object that will hide, or partially hide, an object with an assigned hidden access level 510, the second user will get an error code and be denied the ability to add or reposition the second object as attempted. In an alternative embodiment, if a second user attempts to add or reposition a second object that will hide, or partially hide, an object with an assigned hidden access level 510, the action is allowed and performed. In an aspect of this alternative embodiment, if the second object totally obscures the object with the assigned hidden access level 510, the view displayed to the user who added the object with the hidden access level 510 to the web page will see the object with the hidden access level 510 on their computing device display behind a shadow of the second object that has been positioned over it.

A modify only access level 515 assigned to an object on a collaborative web page allows all users with the proper authority to view and modify the object. In an embodiment an object with a modify only access level 515 cannot be repositioned or deleted by any other user but the user that originally added the object to the web page.

A reposition only access level 520 assigned to an object on a collaborative web page allows all users with the proper authority to view and reposition the object on the web page. In an embodiment an object with a reposition only access level 520 cannot be otherwise modified or deleted by any other user but the user that originally added the object to the web page.

A delete only access level 525 assigned to an object on a collaborative web page allows all users with the proper authority to view the object and delete the object from the web page. In an embodiment an object with a delete only access level 525 cannot be modified or repositioned by any other user but the user that originally added the object to the web page.

A full collaboration access level 530 assigned to an object on a collaborative web page allows all users with the proper authority to view, modify, reposition, delete, or in any other manner affect the object on the web page.

In an embodiment there are various limited collaboration access levels that can be assigned to an object on a collaborative web page. For example, in an embodiment one limited collaboration access level assigned to an object allows all users with the proper authority to view, modify and reposition the object on the web page. In this embodiment limited collaboration access level, such an assigned object cannot be deleted by any user but the user that originally added the object to the web page. In an embodiment a second limited collaboration access level assigned to an object allows all users with the proper authority to view, modify and delete the object on the web page. In this second embodiment limited collaboration access level, such an assigned object cannot be repositioned by anyone other than the user that originally added the object to the web page. In an embodiment a third limited collaboration access level assigned to an object allows all users with the proper authority to view, reposition and delete the object on the web page. In this third embodiment limited collaboration access level, such an assigned object cannot be otherwise modified by anyone other than the user that originally added the object to the web page.

In alternative embodiments, various subsets of the access levels 500 can be assigned to objects added to a collaborative web page. In other alternative embodiments additional and/or different access levels can be assigned to objects added to a collaborative web page.

In an embodiment the default access level assigned to objects added to a collaborative web page is the full collaboration access level 530. In an embodiment the user who adds an object to a collaborative web page can assign an access level to the object that is different than the default access level assigned objects by the embodiment PSC system 100.

In an embodiment users with access to an embodiment PSC system 100 are assigned, or otherwise designated, various authority levels. In one embodiment a user is assigned one authority level for all collaborative web pages supported by an embodiment PSC system 100. In another embodiment a user is assigned a unique authority level for each collaborative web page supported by an embodiment PSC system 100.

In an embodiment the creator of a web page designates the authority levels assigned to the other users with access to the PSC system 100 supporting the web page. In an alternative embodiment a system administrator designates authority levels assigned to users for each web page supported by a PSC system 100. In an aspect of this alternative embodiment a user who generates a web page in a PSC system 100 can override the system administrator authority designation for any particular user and assign a new authority level to the user.

Figure 6:
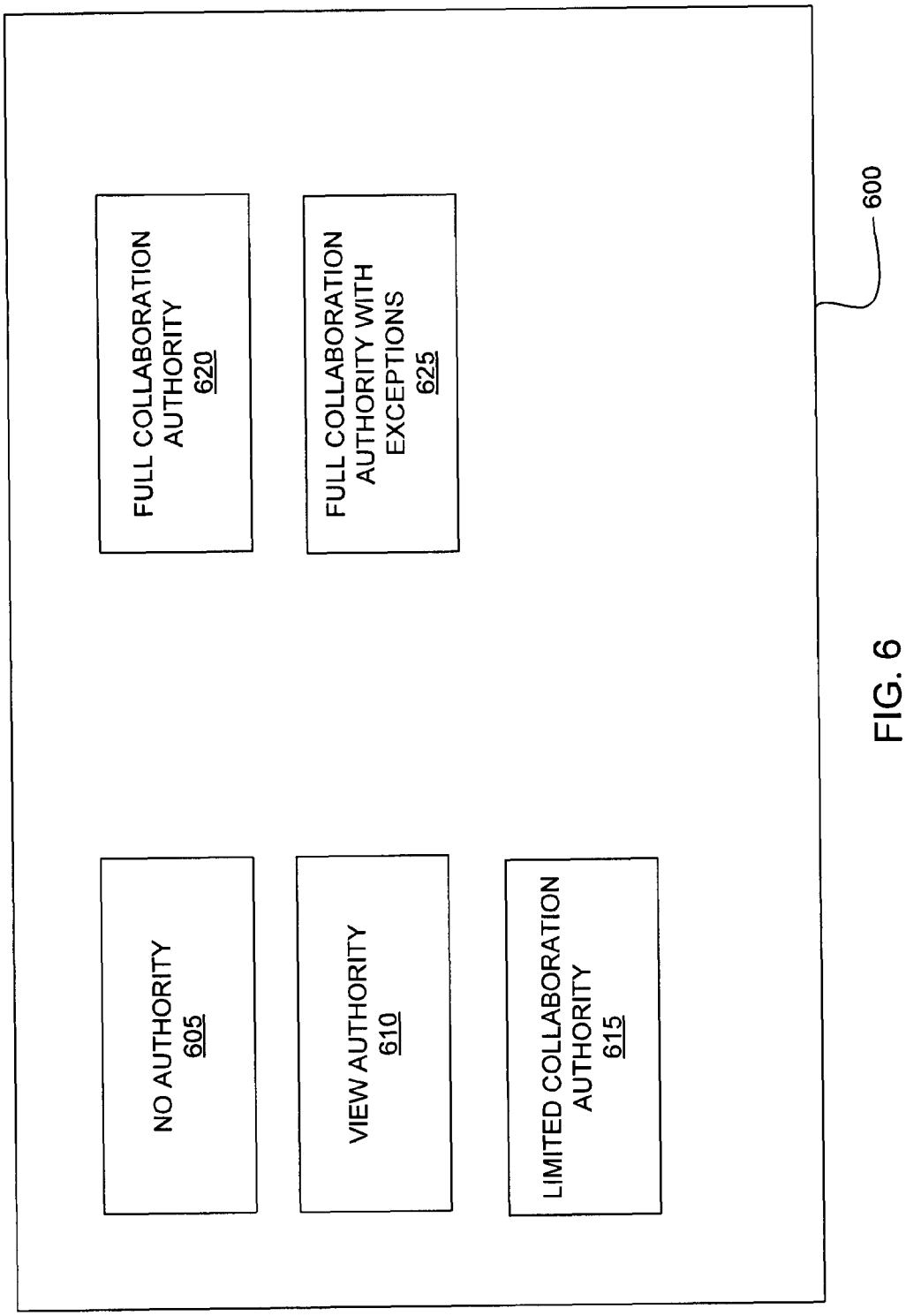
FIG. 6 depicts embodiment user authority levels for a web page supported by an embodiment persistent collaboration system.

FIG. 6 depicts an embodiment of various authority levels 600 that can be assigned users of a PSC system 100. A no authority level 605 assigned a user for one or more web pages supported by an embodiment PSC system 100 means that the user cannot view or otherwise have any access to the one or more web pages.

A view authority level 610 assigned a user for one or more web pages supported by an embodiment PSC system 100 means that the user can only view the one or more web pages. A user with a view authority level 610 cannot add, modify, reposition, delete or, in any other manner, alter any object on any of the one or more web pages to which the user has such an assigned view authority level 610.

In an embodiment a limited collaboration authority level 615 assigned a user for one or more web pages supported by an embodiment PSC system 100 means that the user can only view and add objects to the one or more web pages. In this embodiment a user with an assigned limited collaboration authority level 615 for a web page cannot modify, reposition or delete objects added to the web page by any other user of the web page. In an aspect of this embodiment a user with an assigned limited collaboration authority level 615 can modify, reposition and delete objects that the user has added to the web page.

In a second embodiment a limited collaboration authority level 615 assigned a user for one or more web pages supported by an embodiment PSC system 100 means that the user can view, add and modify objects on the one or more web pages. In this second embodiment a user with an assigned limited collaboration authority level 615 for a web page cannot reposition or delete objects added to the web page by any other user of the web page. In an aspect of this second embodiment a user with an assigned limited collaboration authority level 615 can modify, reposition and delete objects that the user has added to the web page.

In a third embodiment a limited collaboration authority level 615 assigned a user for one or more web pages supported by an embodiment PSC system 100 means that the user can view, add, modify and reposition objects on the one or more web pages. In this third embodiment a user with an assigned limited collaboration authority level 615 for a web page cannot delete objects added to the web page by any other user of the web page. In an aspect of this third embodiment a user with an assigned limited collaboration authority level 615 can modify, reposition and delete objects that the user has added to the web page.

In other embodiments a limited collaboration authority level 615 assigned a user for one or more web pages supported by an embodiment PSC system 100 means the user can perform various combinations of actions on objects on the one or more web pages, although the user cannot perform all actions on the objects. For example, in one such alternative embodiment a user assigned a limited collaboration authority level 615 for one or more web pages supported by an embodiment PSC system 100 can view, add, modify and delete objects on the one or more web pages, but the user cannot reposition any objects added by any other user on the one or more web pages. In an aspect of this alternative embodiment a user can modify, reposition and delete objects that the user has added to the web page.

A full collaboration authority level 620 assigned a user for one or more web pages supported by an embodiment PSC system 100 means the user has complete access to all objects on the one or more web pages. Thus, a user with an assigned full collaboration authority level 620 can view, add, modify, reposition and delete any object on the one or more web pages whether or not the user or any other user originally added the object to the respective web page.

Figure 7:
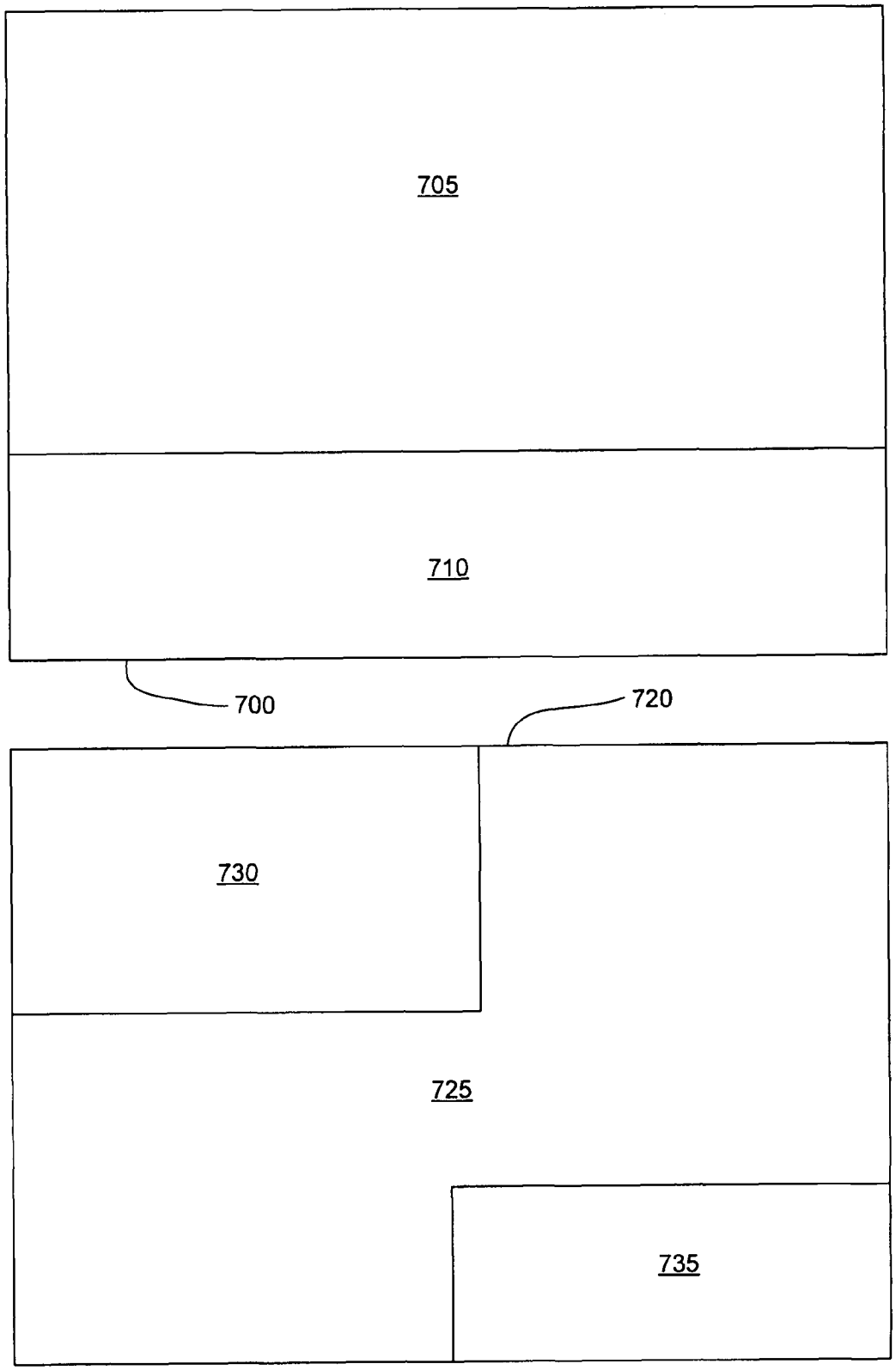
FIG. 7 depicts exemplary web pages in an embodiment persistent collaboration system divided into one or more regions.

In an embodiment a full collaboration authority with exceptions level 625 assigned a user for one or more web pages supported by an embodiment PSC system 100 means the user has complete access to all objects on the one or more web pages except for objects in one or more designated regions, or areas, on the one or more web pages. For example, and referring to FIG. 7, in this embodiment assigning a user full collaboration authority with exceptions level 625 for exemplary web page 700 can dictate that the user can view, add, modify, reposition and delete any objects in a first region 705 of the web page 700, but the user can only view objects positioned in a second region 710 of the same web page 700.

As another example, in this embodiment assigning a user full collaboration authority with exceptions level 625 for exemplary web page 720 can dictate that the user can view, add, modify, reposition and delete any objects in a first region 725 of the web page 720, but the user can only view objects positioned in a second region 730 or a third region 735 of the same web page 720.

In an alternative aspect of this embodiment a user assigned a full collaboration authority with exceptions level 625 for a particular web page has no authority to even view objects positioned in one or more designated areas on the web page. Thus, for example, and again referring to FIG. 7, in this alternative aspect of this embodiment assigning a user full collaboration authority with exceptions level 625 for exemplary web page 700 can dictate that the user can view, add, modify, reposition and delete objects in a first region 705 of the web page 700, but the user cannot even view, let alone, add, modify, reposition or delete, objects positioned in a second region 710 of the same web page 700.

In other alternative aspects of this embodiment a user assigned a full collaboration authority with exceptions level 625 for a particular web page has full access to objects positioned in one or more regions of the one or more web pages and limited access to objects positioned in one or more other regions of the one or more web pages. For example, in one such other alternative aspect of this embodiment, assigning a user full collaboration authority with exceptions level 625 for exemplary web page 720 can dictate that the user can view, add, modify, reposition and delete objects in a first region 725 of the web page 720, but the user can only view and add objects in a second region 730 or a third region 735 of the same web page 720. As another example in this alternative aspect of this embodiment, assigning a user full collaboration authority with exceptions level 625 for exemplary web page 720 can dictate that the user can view, add, modify, reposition and delete objects in a first region 725 of the web page 720, but the user can only view, add and reposition objects in a second region 730 and can only view objects in a third region 735 of the same web page 720.

In still other alternative embodiments, various subsets of the authority levels 600 can be assigned to users for web pages supported by an embodiment PSC system 100. In yet other alternative embodiments additional and/or different authority levels can be assigned to users for web pages supported by an embodiment PSC system 100.

In an embodiment an object's access level 500 supersedes a user's authority level 600. Thus, for example, and referring to FIG. 4, assume a user A who has added picture 405 to the web page 400 has assigned the picture object 405 an access level of view only access 505. Further assume a second user C has full collaboration authority 620 for the web page 400. In this embodiment, even though user C has full collaboration authority 620 for web page 400, meaning that user C can, in general, add, modify, reposition and delete objects on web page 400, user C is limited to only viewing picture object 405. This is because in this embodiment the picture object's view only access level 505 supersedes user C's full collaboration authority 620 for the web page 400 hosting the picture object 405.

In an embodiment new web pages can be added to a PSC system 100 and linked to a current web page supported by the PSC system 100. In an embodiment a link from a first web page to one or more other web pages of a PSC system 100 can be assigned, or otherwise associated with, any object on the first web page, any annotation of any object on the first web page and/or one or more positions established for linkage on the first web page, e.g., position 425 on web page 400 of FIG. 4 can be established by a user as a link to one or more other web pages.

In an embodiment PSC system 100 filtering is available for a user to define which objects on a respective web page are to be exhibited in the user's view of the web page. For example, a user can filter, or otherwise hide from their current view of a web page, objects created, or otherwise added to the web page, before a certain date, objects created, or otherwise added to the web page, by one or more identified users, objects positioned in a particular x-y coordinate region on the web page, objects that have one or more identified properties, e.g., are picture objects, are text objects, are of a certain size, etc. As another example, a user can filter, or otherwise only show in their current view of a web pages, objects created, or otherwise added to the web page, after a certain date, objects created, or otherwise added to the web page, by one or more identified users, objects positioned in a particular x-y coordinate region on the web page, objects that have one or more identified properties, e.g., are picture objects, are text objects, are of a certain size, etc.

In an embodiment one user's filtering of objects on a collaborative web page does not affect any other user's simultaneous view of the same web page. Thus, for example, a user A's filtering of all objects created, or otherwise added to, a web page before a certain date, in effect hiding these objects from user A's view of the web page, does not affect a user B's simultaneous view of the same web page, which, in user B's view continues to show the objects filtered by user A.

In an embodiment PSC system 100 zooming in and out on a web page is available to a user who wants to look at just one x-y coordinate region of a web page or who, alternatively, wants to zoom out from just one x-y coordinate region of a web page to the full web page view. In an embodiment one user's action of zooming in, or out, on a collaborative web page does not affect any other user's simultaneous view of the same web page. Thus, for example, if a user A zooms in on region 730 of web page 720 in FIG. 7, in effect, only viewing region 730 of the web page 720 on their computing device display, this action will not affect a user B's simultaneous view of the same web page 720. In this example, user B will continue to view the entire web page 720 on their respective computing device display at the same time that user A is viewing only region 730 of the same web page 720.

In an embodiment PSC system 100 users can sort objects on one or more web pages. For example, in this embodiment one user can sort objects of a particular web page based on the time each object was generated, or otherwise added to, the web page, while another user can sort objects of the same web page based on one or more object metadata characteristics, e.g., object size, object position on the web page, and/or object type, etc.

An embodiment PSC system 100 has an option, i.e., an age option, that causes objects on one or more web pages supported by the PSC system to visually age, based on each object's meta data. In an aspect of this embodiment the age option, when employed, fades objects that have been created, or otherwise added to the web page, before an established date and/or time, i.e., aged objects. In another aspect of this embodiment, the age option, when employed, yellows, i.e., tints objects yellow in the various users' views of the web page, which were created, or otherwise added to the web page, before an established date and/or time, i.e., aged objects. In yet other alternative aspects of this embodiment, the age option, when employed, affects the view of objects with predefined meta data in various other manners, e.g., tints identified aged objects other colors, e.g., blue, green, etc., resizes aged objects to a predefined minimized size, relocates aged objects to a predefined region on the web page, etc.

In an embodiment a system administrator of an embodiment PSC system 100 can activate the age option. In an embodiment the user who originally created, or otherwise started, a web page in an embodiment PSC system 100 can activate the age option. In an embodiment any user with full collaboration authority 620 for a web page in an embodiment PSC system 100 can activate the age option for objects of the respective web page. In other embodiments other users and/or combinations of users and/or the system administrator of an embodiment PSC system 100 can activate the age option for a web page.

In an alternative embodiment the age option is a default option that can be overrode, i.e., turned off or otherwise disabled, by either the system administrator of an embodiment PSC system 100, the user who originally created, or otherwise started, the web page, any user with full collaboration authority 620 for the web page, or other users or combinations of users and/or the system administrator of an embodiment PSC system 100.

In an embodiment, once the age option is enabled for a web page, all users' views of the web page are affected by the age option. In an alternative embodiment, if one user, with the proper authority, enables the age option for a web page, only that user's view of the web page is affected by the age option operation. In this alternative embodiment all other users' views of the same web page are unaffected by, and therefore do not reflect the enabling of, the age option.

An embodiment PSC system 100 supports web page versioning in which various versions of a single web page can be maintained, accessed and worked on at any one time.

An embodiment PSC system 100 provides undo-redo support for additions, modifications and deletions performed on a respective web page.

An embodiment PSC system 100 provides the capability for time history playback of editing performed on a respective web page. In this embodiment one or more users have access to, i.e., can view or otherwise playback, a time history of the editing, i.e., additions, modifications and deletion of objects, performed on a particular web page. In an aspect of this embodiment a system administrator for the PSC system 100 has access to the time history of the editing performed on all web pages supported by the PSC system 100. In an aspect of this embodiment only users with one or more particular authority levels for the respective web page, e.g., only users with full collaboration authority 620, or only users with limited collaboration authority 615 or full collaboration authority 620, can access the time history of the editing performed on the web page. In an alternative aspect of this embodiment any user can access the time history of the editing performed on the web pages supported by a PSC system 100.

In an embodiment templates are employed as an aid to controlling the editing and/or presentation of objects on web pages supported by a PSC system 100. In an aspect of this embodiment templates are created for and hosted by an embodiment PSC system 100 for use by users of web pages supported by the PSC system 100. In another aspect of this embodiment users can also create templates for assistance in controlling the editing and/or presentation of objects on one or more web pages supported by a PSC system 100. In this aspect of this embodiment, user-created templates can be shared among one or more users of the one or more web pages supported by the PSC system 100.

In an embodiment only users with one or more particular authority levels for a respective web page, e.g., only users with full collaboration authority 620, or only users with limited collaboration authority 615 or full collaboration authority 620, can author templates for aid in controlling the editing and/or presentation of objects on the web page. In an alternative embodiment any user can author a template for assistance in controlling the editing and/or presentation of objects on a web page.

In an embodiment only users with one or more particular authority levels for a respective web page can access the templates generated for assistance in controlling the editing and/or presentation of objects on the web page. In an alternative embodiment only users with one or more particular authority levels for a respective web page can access user-created templates generated for assistance in controlling the editing and/or presentation of objects on the web page. In this alternative embodiment these same users with one or more particular authority levels for a respective web page can access the templates created for and hosted by the PSC system 100 for web pages supported by the PSC system 100. In a second alternative embodiment any user can access any template associated, or otherwise useable, with any web page supported by the PSC system 100. In this second alternative embodiment, however, access to a template does not supersede a user's web page authority level or any object's access level.

In an embodiment temporal, i.e., time-sensitive, templates are created for and hosted by an embodiment PSC system 100. In an aspect of this embodiment one or more users can also generate temporal templates for assistance with editing and/or presenting objects on one or more web pages supported by a PSC system 100.

In an embodiment PSC system 100 slide shows can be created for one or more web pages. In an embodiment a slide show for a web page in a PSC system 100 can be temporal, i.e., time-sensitive in nature. In an embodiment a slide show for a web page in a PSC system 100 can be determined by one or more metadata characteristics of the objects on the respective web page, e.g., object size, object position on the web page and/or object type, etc.

In an embodiment various users can each, simultaneously, access different views of the same web page supported by a PSC system 100. For example, one user can request, or otherwise define, a first layout for the objects of a web page that are presented in a first view to this user while, simultaneously, a second user can request, or otherwise define, a second layout for the objects of the same web page that are, simultaneously, presented in a second view to this second user. As another example, a first user can request a first sort order for objects of a web page while a second user can, simultaneously, request a second sort order for the objects of the same web page. With this embodiment, among other benefits, two or more users can collaborate simultaneously on the same web page, each viewing the objects of the web page in a manner most pertinent to, or otherwise understandable, meaningful, or even aesthetically pleasing, to each user.

In addition to manual user-driven layout of web page objects, an embodiment PSC system 100 supports automatic programmatic layout of web page objects. In this embodiment temporal considerations, e.g., when an object was added to the web page, when a web page object was last edited, etc., sort orders, object metadata, and/or object type, etc., can be used by a program to automatically layout objects on a respective web page. With this embodiment a large number of objects can be quickly, and easily, rearranged on a web page based on user-identified criteria.

An embodiment PSC system 100 supports entity identification and extraction in which one or more web pages are automatically examined for the presence of pre-identified entities which, if they exist on the searched web page(s), are tagged and/or copied to another location, e.g., another web page, a predefined database location, etc. In this embodiment an entity can be anything of any object type. Examples of entities include, but are not limited to, phone numbers, emails, addresses, specifications for, e.g., products, architectural designs, etc., black and white photographic pictures, audio files containing pre-identified melodies, audio/visual files containing pre-identified images and/or sound bites, etc. Among other benefits, entity identification and extraction enables the generation of rich metadata for describing one or more web pages.

An embodiment PSC system 100 supports automatic web page generation and web page view generation of pre-existing entities located on one or more existing web pages. For example, in this embodiment a web page can be automatically generated by the PSC system 100, or a view of an existing web page can be automatically created by the PSC system 100, containing pre-identified entities located on one or more existing web pages. Examples of such pre-identified entities include, but are not limited to, phone numbers, emails, addresses, specifications for, e.g., products, architectural designs, etc., black and white photographic pictures, audio files containing pre-identified melodies, audio/visual files containing pre-identified images and/or sound bites, etc. Among other benefits, automatic web page generation and web page view generation allows for quick and user effortless access to a collection of entities that are otherwise spread out across various web pages supported by the embodiment PSC system 100.

FIGS. 8A, 8B, 8C, 8D, 8E and 8F illustrate an embodiment logic flow for a methodology for web-based persistent, spatial collaboration. While the following discussion is made with respect to systems portrayed herein, the operations described may be implemented in other systems. Further, the operations described herein are not limited to the order shown. Additionally, in other alternative embodiments more or fewer operations may be performed.

Figure 8A:
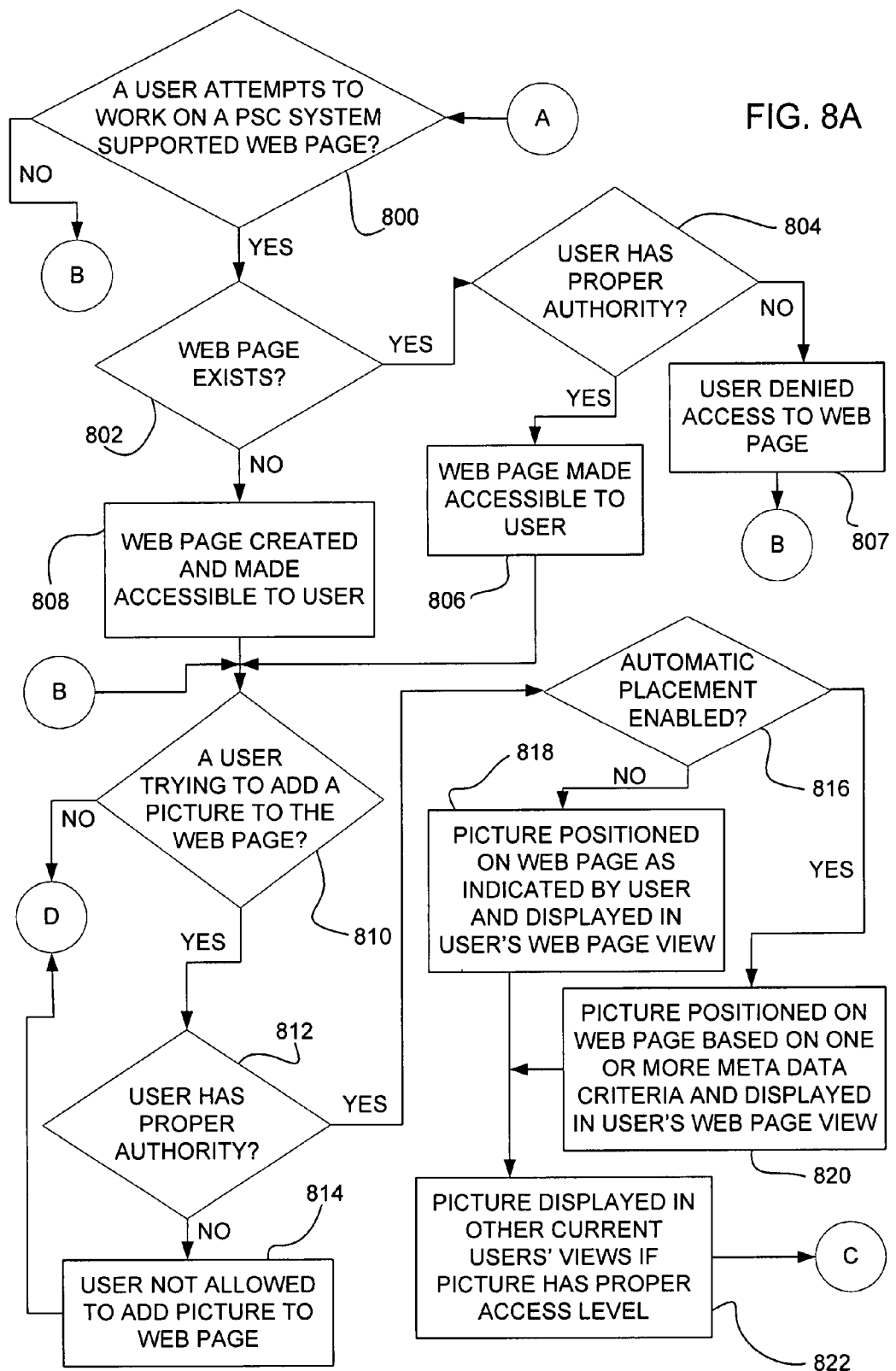
FIGS. 8A, 8B, 8C, 8D, 8E and 8F illustrate an embodiment logic flow in persistent spatial collaboration systems.

Referring to FIG. 8A, at decision block 800 a determination is made as to whether a user is attempting to work on and/or view a PSC system-supported web page. If yes, at decision block 802 a determination is made as to whether the web page currently exists. If no, a web page is created and made accessible to the user 808. If, however, at decision block 802 it is determined that the web page the user is attempting to work on and/or view exists, at decision block 804 a determination is made as to whether the user has a proper authority level for accessing the web page. If yes, the web page is made accessible to the user 806. If no, the user is denied access to the web page 807.

At decision block 810, a determination is made as to whether a user is trying to add a picture object to a web page they currently have access to. If yes, at decision block 812 a determination is made as to whether the user has a proper authority level for adding a picture object to the web page. If no, the user is not allowed to add the picture object to the web page 814. If, however, the user has a proper authority level for adding a picture object to the web page, at decision block 816 a determination is made as to whether automatic placement is currently enabled, i.e., whether or not the system is enabled to automatically position picture objects based on one or more object meta data characteristics.

If automatic placement is currently enabled, the picture object the user wishes to add to the web page is automatically positioned on the web page based on one or more meta data characteristics of the picture object, and is displayed in the user's web page view 820. If, however, automatic placement is not currently enabled, the picture object the user wishes to add to the web page is positioned on the web page as directed by the user and is displayed in the user's web page view 818. In either case, the picture object is then displayed in other current users' views of the web page, i.e., in the views of the other users currently accessing the web page, if the picture object access level allows for this 822, e.g., the picture object access level is not hidden access 510.

Figure 8B:
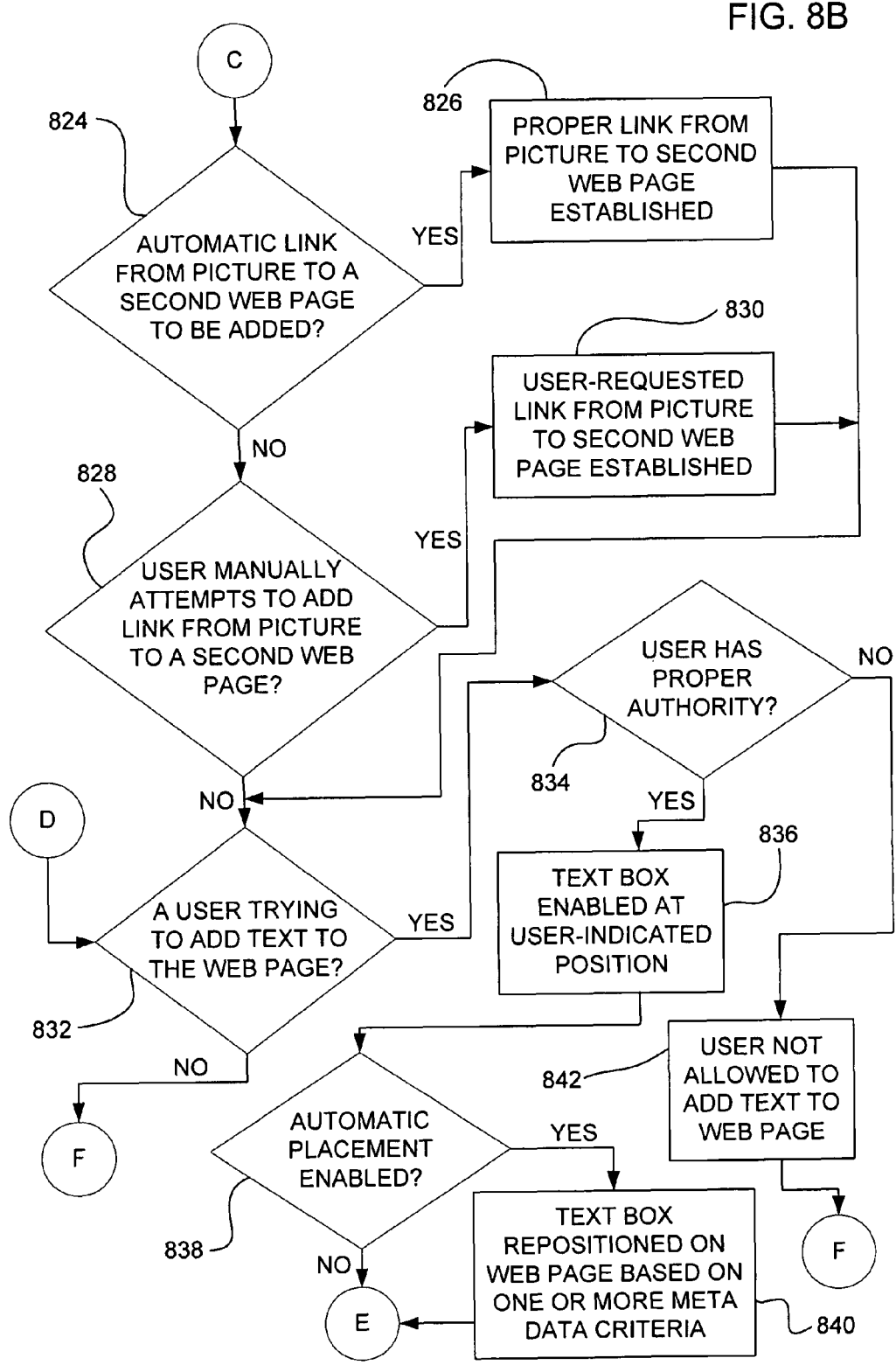

Referring to FIG. 8B, at decision block 824 a determination is made as to whether, based on predetermined criteria, an automatic link is to be established from the newly added picture object to a second web page. If yes, the proper link between the picture object and the second web page is established 826.

If no automatic link is to be established, at decision block 828 a determination is made as to whether the user who added the picture object to the web page is attempting to create a link from the picture object to a second web page. If yes, the user-requested link between the picture object and the second web page is established 830.

At decision block 832 a determination is made as to whether a user is trying to add text to a web page they currently have access to. If yes, at decision block 834 a determination is made as to whether the user has a proper authority level for adding text to the web page. If no, the user is not allowed to add text to the web page 842. If, however, the user has a proper authority level for adding text to the web page, a text box is enabled at the user designated position on the web page and the user can input text to the text box 836.

At decision block 838 a determination is made as to whether automatic placement is currently enabled, i.e., whether or not the system is enabled to automatically position text objects based on one or more object meta data characteristics. If automatic placement is currently enabled, the text object is automatically positioned, or repositioned, on the web page based on one or more meta data characteristics of the text object 840.

Figure 8C:
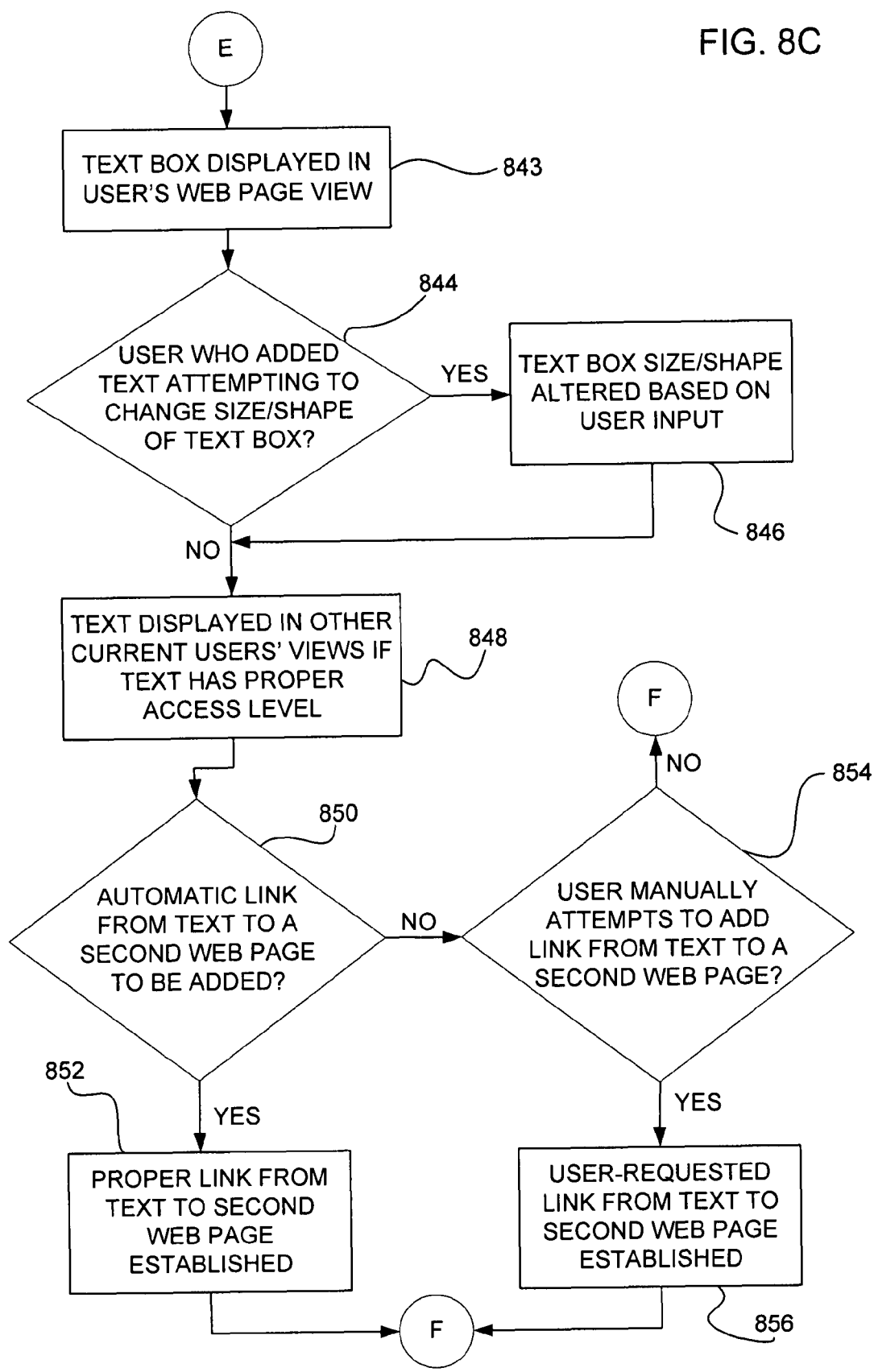

Referring to FIG. 8C, the added text box object is displayed in the user's view of the web page 843. At decision block 844 a determination is made as to whether the user who added the text box object to the web page is attempting to change the size and/or shape of the text box object. If yes, the text box size and/or shape is altered based on the user's input 846.

After a text box object is added to a web page the text is displayed in other current users' views of the web page, i.e., in the views of the other users currently accessing the web page, if the text box object access level allows for this 848, e.g., the text box object access level is not hidden access 510.

At decision block 850 a determination is made as to whether, based on predetermined criteria, an automatic link is to be established from the newly added text box object to a second web page. If yes, the proper link between the text box object and the second web page is established 852.

If no automatic link is to be established, at decision block 854 a determination is made as to whether the user who added the text box object to the web page is attempting to create a link from the text box object to a second web page. If yes, the user-requested link between the text box object and the second web page is established 856.

Figure 8D:
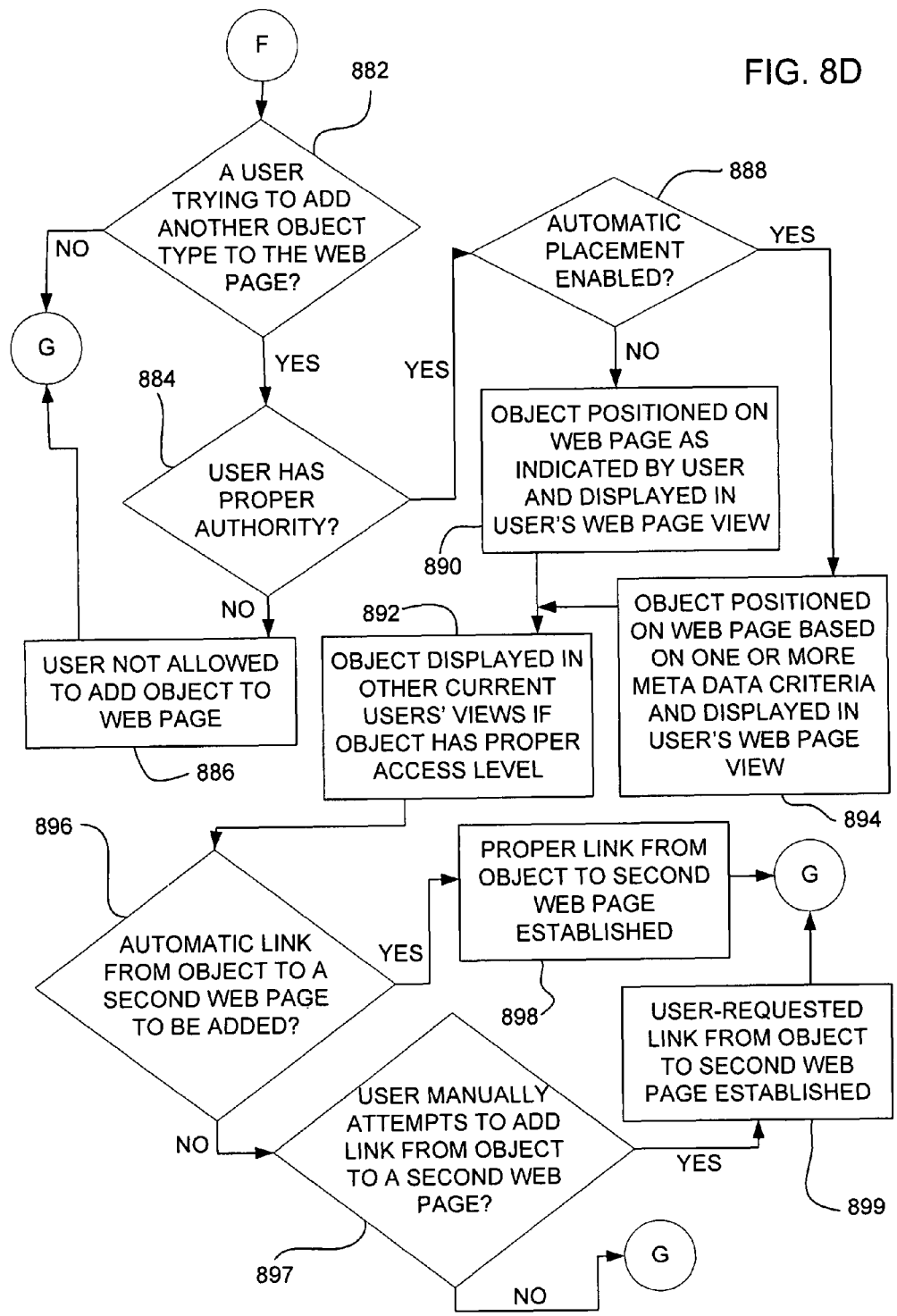

Referring to FIG. 8D, at decision block 882 a determination is made as to whether a user is trying to add another object type, e.g., an audio/visual file or an audio file, to a web page they currently have access to. If yes, at decision block 884 a determination is made as to whether the user has a proper authority level for adding the object to the web page. If no, the user is not allowed to add the object to the web page 886. If, however, the user has a proper authority level for adding the new object to the web page, at decision block 888 a determination is made as to whether automatic placement is currently enabled, i.e., whether or not the system is enabled to automatically position the object type based on one or more object meta data characteristics.

If automatic placement is currently enabled, the object the user wishes to add to the web page is automatically positioned on the web page based on one or more meta data characteristics of the object, and is displayed, or otherwise indicated, in the user's web page view 894. If, however, automatic placement is not currently enabled, the object the user wishes to add to the web page is positioned on the web page as directed by the user and is displayed, or otherwise indicated, in the user's web page view 890. In either case, the newly added object is then displayed, or otherwise indicated, in other current users' views of the web page, i.e., in the views of the other users currently accessing the web page, if the object access level allows for this 892, e.g., the object access level is not hidden access 510.

At decision block 896 a determination is made as to whether, based on predetermined criteria, an automatic link is to be established from the newly added object to a second web page. If yes, the proper link between the object and the second web page is established 898.

If no automatic link is to be established, at decision block 897 a determination is made as to whether the user who added the object to the web page is attempting to create a link from the object to a second web page. If yes, the user-requested link between the object and the second web page is established 899.

Figure 8E:
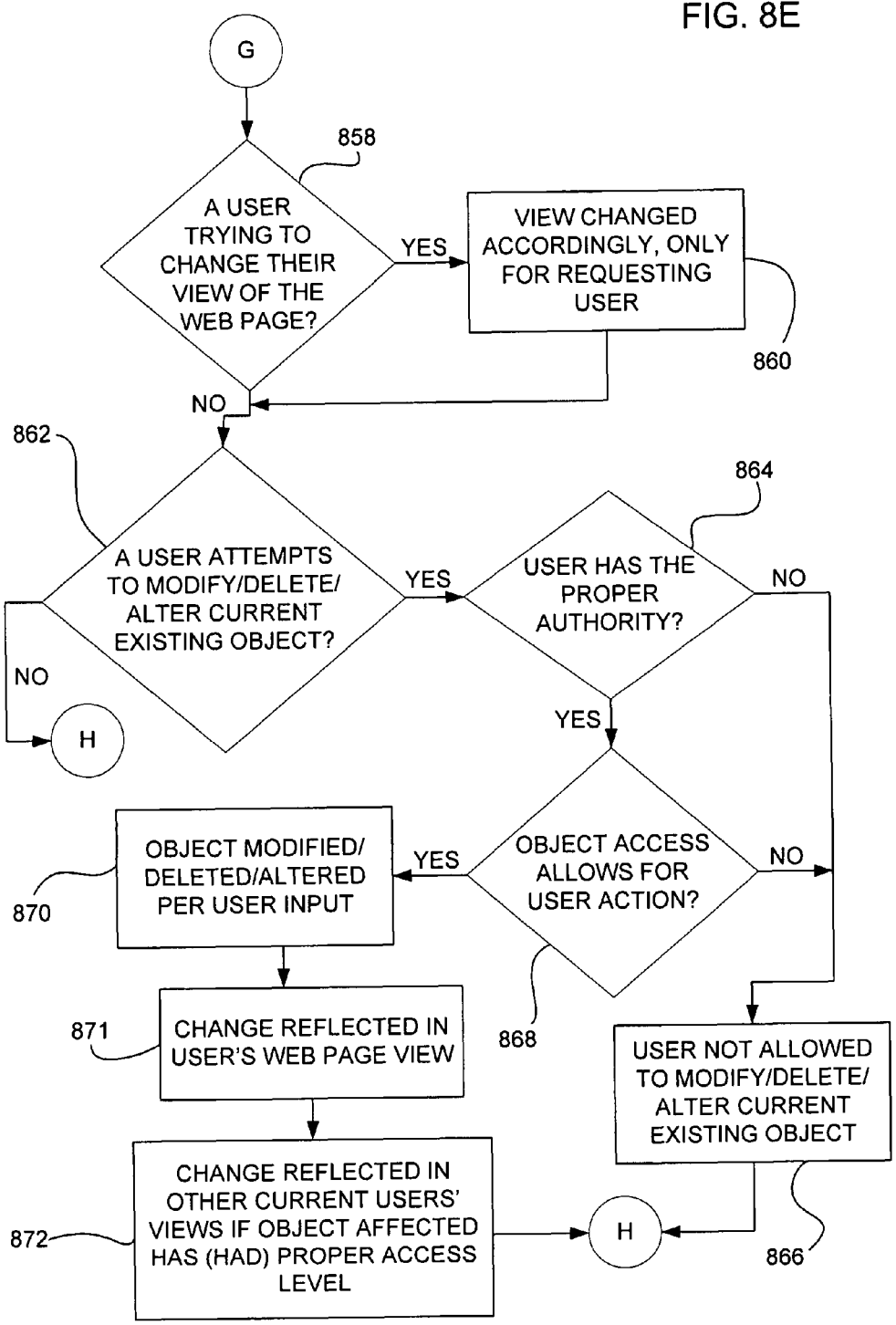

Referring to FIG. 8E, at decision block 858 a determination is made as to whether a user wishes to change their view of the web page currently being accessed, e.g., zoom, filter, etc. If yes, the view for that user is changed accordingly on their respective computing device display 860.

At decision block 862 a determination is made as to whether a user is attempting to modify, delete, reposition, or in any other manner, alter a currently existing object on the web page. If yes, at decision block 864 a determination is made as to whether the user has a proper authority level for the attempted action. If no, the user is not allowed to modify, delete, reposition, or otherwise alter, the object on the web page 866. If, however, the user has a proper authority level for the action attempted on the web page object, at decision block 868 a determination is made as to whether the object access level allows the user to perform the desired action on the object. If no, the user is not allowed to modify, delete, reposition, or otherwise alter, the object on the web page 866.

If, however, the object access level allows for the user to modify, delete, reposition, or otherwise alter, the web page object the object is modified, deleted, repositioned, or otherwise altered, per the user input 870. The change is then reflected in the user's view of the web page 871. The change is also reflected in other current users' views of the web page, i.e., in the views of the other users currently accessing the web page, if the respective object access level allows for this 872, e.g., the object access level is (was) not hidden access 510.

Figure 8F:
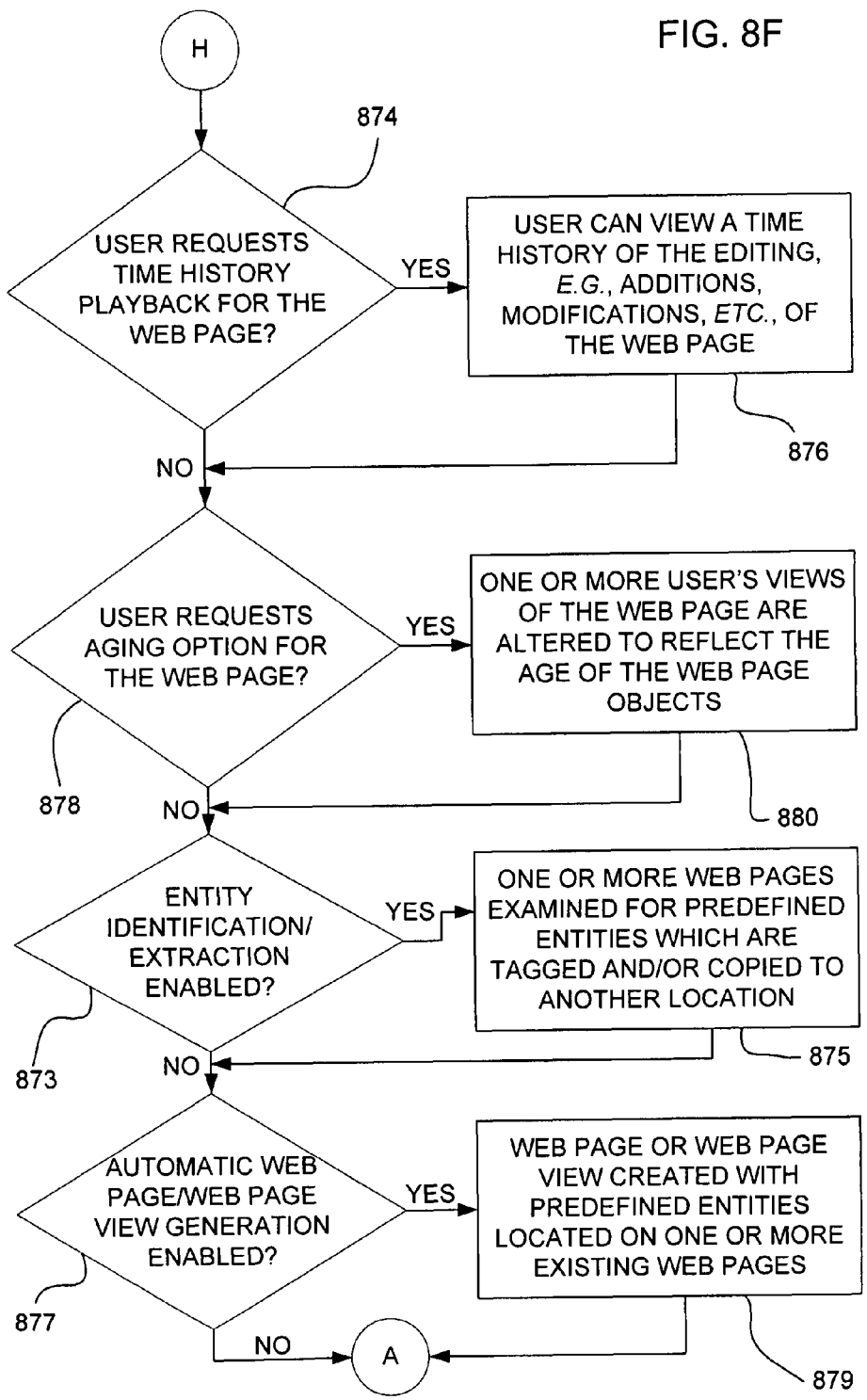

Referring to FIG. 8F, at decision block 874 a determination is made as to whether a user has requested a time history playback of the web page. If yes, the user is provided access to view a time history of the editing, e.g., additions, modifications, etc., of the web page 876.

At decision block 878 a determination is made as to whether a user has requested to enable an aging option for the web page. If yes, the user's view of the web page is altered to reflect the age of the web page objects 880. In an embodiment the web page views of one or more other current users, i.e., other users currently accessing the web page, are also correspondingly altered to reflect the age of the web page objects 880.

At decision block 873 a determination is made as to whether entity identification and extraction has been enabled. If yes, one or more web pages are examined for predefined entities which, if located, are then tagged and/or copied to another location 875, e.g., a new web page, a database location, etc.

At decision block 877 a determination is made as to whether automatic web page or web page view generation has been enabled. If yes, a web page, or web page view, is created with predefined entities that are currently located on one or more existing web pages 879.

Application Usages

Figure 9:
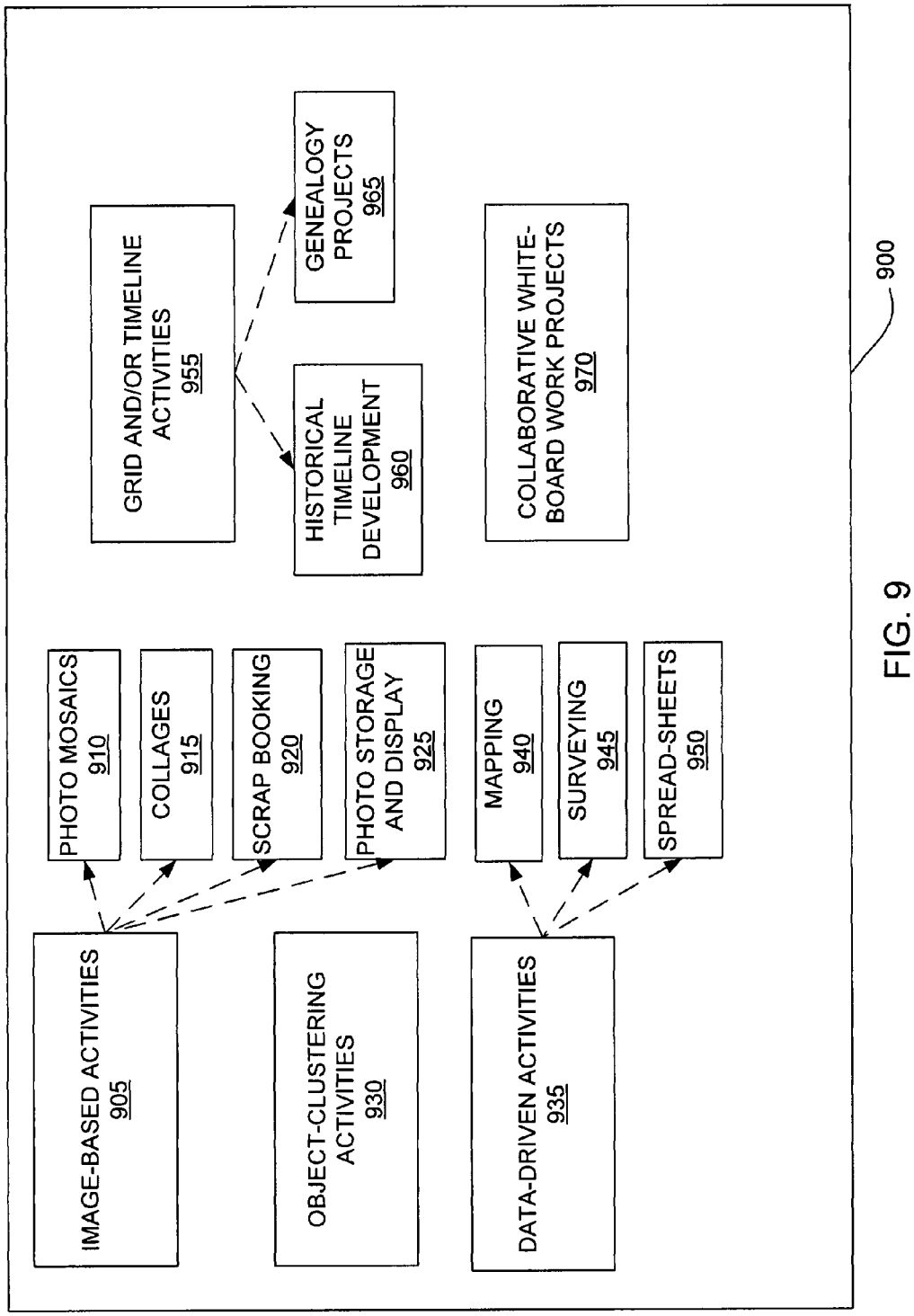
FIG. 9 depicts representative applications of the principles of an embodiment persistent collaboration system.

The application of an embodiment PSC system 100 as described herein is limited only by users' imaginations and needs. As shown in FIG. 9, a few representative applications of this system include image-based activities 905, e.g., photo mosaics 910, collages 915, scrap booking 920, photo storage and display 925, etc., object clustering based on one or more object metadata characteristics 930, data-driven activities 935, e.g., mapping 940, surveying 945, spread-sheets 950, etc., grid and/or timeline activities 955, e.g., historical timeline development 960, such as, but not limited to, a timeline of one or more events of World War II, genealogy projects 965, etc., and collaborative white-board work projects with users potentially in remote locations 970. Many other applications can also employ the principles explained herein.

Computing Device System Configuration

Figure 10:
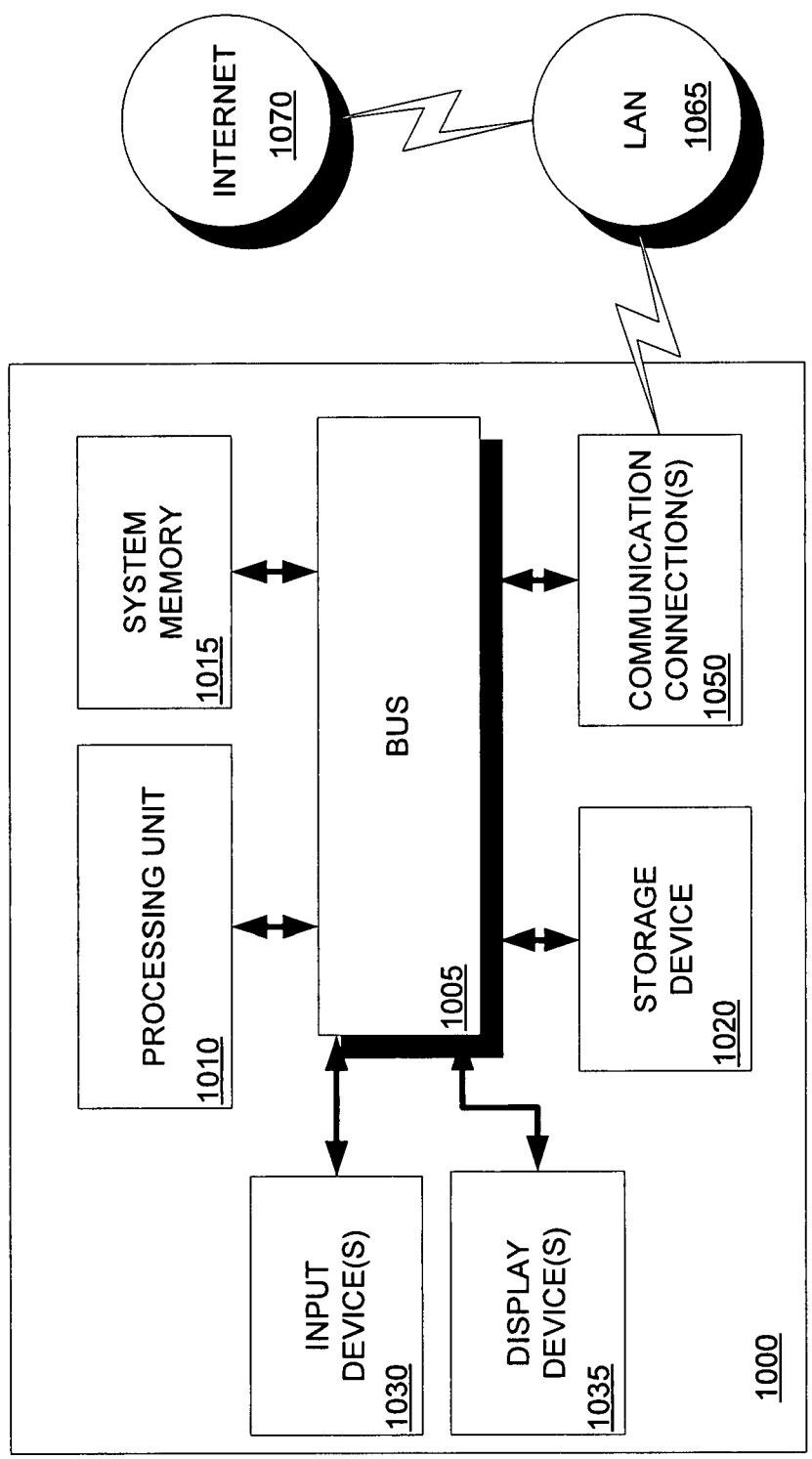
FIG. 10 is a block diagram of an exemplary basic computing device system that can process software, i.e., program code, or instructions.

FIG. 10 is a block diagram that illustrates an exemplary computing device system 1000 upon which an embodiment can be implemented. The computing device system 1000 includes a bus 1005 or other mechanism for communicating information, and a processing unit 1010 coupled with the bus 1005 for processing information. The computing device system 1000 also includes system memory 1015, which may be volatile or dynamic, such as random access memory (RAM), non-volatile or static, such as read-only memory (ROM) or flash memory, or some combination of the two. The system memory 1015 is coupled to the bus 1005 for storing information and instructions to be executed by the processing unit 1010, and may also be used for storing temporary variables or other intermediate information during the execution of instructions by the processing unit 1010. The system memory 1015 often contains an operating system and one or more programs, and may also include program data.

In an embodiment, a storage device 1020, such as a magnetic or optical disk, is also coupled to the bus 1005 for storing information, including program code comprising instructions and/or data.

The computing device system 1000 generally includes one or more display devices 1035, such as, but not limited to, a display screen, e.g., a cathode ray tube (CRT) or liquid crystal display (LCD), a printer, and one or more speakers, for providing information to a computing device user. The computing device system 1000 also generally includes one or more input devices 1030, such as, but not limited to, a keyboard, mouse, trackball, pen, voice input device(s), and touch input devices, which a computing device user can use to communicate information and command selections to the processing unit 1010. All of these devices are known in the art and need not be discussed at length here.

The processing unit 1010 executes one or more sequences of one or more program instructions contained in the system memory 1015. These instructions may be read into the system memory 1015 from another computing device-readable medium, including, but not limited to, the storage device 1020. In alternative embodiments, hard-wired circuitry may be used in place of or in combination with software program instructions. Thus, the computing device system environment is not limited to any specific combination of hardware circuitry and software.

The term "computing device-readable medium" as used herein refers to any medium that can participate in providing program instructions to the processing unit 1010 for execution. Such a medium may take many forms, including but not limited to, storage media and transmission media. Examples of storage media include, but are not limited to, RAM, ROM, EEPROM, flash memory, CD-ROM, digital versatile disks (DVD), magnetic cassettes, magnetic tape, magnetic disk storage, or any other magnetic medium, floppy disks, flexible disks, punch cards, paper tape, or any other physical medium with patterns of holes, memory chip, or cartridge. The system memory 1015 and storage device 1020 of the computing device system 1000 are further examples of storage media. Examples of transmission media include, but are not limited to, wired media such as coaxial cable(s) and copper wire, and wireless media such as fiber optic signals, acoustic signals, RF signals and infrared signals.

The computing device system 1000 also includes one or more communication connections 1050 coupled to the bus 1005. The communication connection(s) 1050 provide a two-way data communication coupling from the computing device system 1000 to other computing devices on a local area network (LAN) 1065 and/or wide area network (WAN), including the World Wide Web, or Internet 1070. Examples of the communication connection(s) 1050 include, but are not limited to, an integrated services digital network (ISDN) card, modem, LAN card, and any device capable of sending and receiving electrical, electromagnetic, optical, acoustic, RF or infrared signals.

Communications received by the computing device system 1000 can include program instructions and program data. The program instructions received by the computing device system 1000 may be executed by the processing unit 1010 as they are received, and/or stored in the storage device 1020 or other non-volatile storage for later execution.

CONCLUSION

While various embodiments are described herein, these embodiments have been presented by way of example only and are not intended to limit the scope of the claimed subject matter. Many variations are possible which remain within the scope of the following claims. Such variations are clear after inspection of the specification, drawings and claims herein. Accordingly, the breadth and scope of the claimed subject matter is not to be restricted except as defined with the following claims and their equivalents.

What is claimed is:

1. A method for internet-hosted persistent collaboration, the method comprising:
    a first user causing, via a first user's computing device, a web page to be generated;
    displaying a view of the web page to the first user via the first user's computing device;
    the first user adding a first object to the web page at a first desired position on the web page;
    updating the view of the web page displayed to the first user to include the first object in the first desired position on the web page;
    a second user accessing the web page via a second user's computing device, wherein a view of the web page is displayed to the second user via the second user's computing device, and wherein the view of the web page displayed to the second user contains the first object in the first desired position on the web page;
    the first user adding a second object to the web page at a second desired position on the web page;
    updating the view of the web page displayed to the second user to include the second object added by the first user at the second desired position on the web page;
    the second user adding a third object to the web page at a third desired position on the web page;
    updating the view of the web page displayed to the first user to include the third object added by the second user at the third desired position on the web page;
    repositioning the first object on the web page based on one or more user inputs to the first user's computing device;
    updating the view of the web page displayed on the first user's computing device to reflect the repositioning of the first object on the web page;
    updating the view of the web page displayed to the second user via the second user's computing device to reflect the repositioning of the first object on the web page, the updated view of the web page displayed on the second user's computing device not including the first object when the first object is repositioned to a region of the web page in which an authority level of the second user limits a viewing access by the second user's computing device with respect to any objects positioned in the region; and
    altering the view of the web page displayed on the first user's computing device or the second user's computing device, such that a view of at least one object appearing in the altered view of the web page reflects that the at least one object was added to the web page before a predetermined date, before a predetermined time, or before the predetermined date and the predetermined time.

2. The method for internet-hosted persistent collaboration of claim 1, further comprising storing in a database information necessary to generate a view of the web page displayed to the first user via the first user's computing device and a view of the web page displayed to the second user via the second user's computing device.

3. The method for internet-hosted persistent collaboration of claim 2, wherein the first user's computing device employs a web browser and the second user's computing device employs a web browser, further comprising:
    the web browser employed by the first user's computing device passing information regarding the addition of the first object by the first user to the web page to a web service application server;

the web service application server storing in a database data from the information regarding the addition by the first user of the first object to the web page;

the web browser employed by the second user's computing device periodically polling the web service application server to determine if a change has been made to the web page;

the web service application server retrieving from the database data regarding the addition by the first user of the first object to the web page;

the web service application server forwarding information generated from the data retrieved from the database to the web browser employed by the second user's computing device; and the web browser employed by the second user's computing device using the information forwarded from the web service application server to update the view of the web page displayed to the second user to include the first object added by the first user at the first desired position on the web page.

4. The method for internet-hosted persistent collaboration of claim 3, wherein the data stored in the database from the information regarding the addition by the first user of the first object to the web page is the information the web browser employed by the first user's computing device passed to the web service application server regarding the addition by the first user of the first object to the web page.

5. The method for internet-hosted persistent collaboration of claim 1, wherein each object added to a web page has a respective assigned access level and wherein the first object added to the web page by the first user is assigned a first access level and the second object added to the web page by the first user is assigned a second access level which is different from the first access level.

6. The method for internet-hosted persistent collaboration of claim 1, wherein the first object is a text box and the second object is a picture.

7. The method for internet-hosted persistent collaboration of claim 1, wherein the first user and the second user are each assigned a respective authority level for the web page and wherein the respective assigned authority levels determine an ability of the first user and an ability of the second user to access, view, add to, modify, and delete an object from the web page.

8. The method for internet-hosted persistent collaboration of claim 1, further comprising:

limiting access to one or more objects on the web page when a user has a particular authority level for the web page and the one or more objects are positioned in one or more particular regions of the web page.

9. A method for persistent spatial collaboration on the internet, the method comprising:

generating a web page based on one or more first user inputs to a first user's computing device;

displaying on the first user's computing device a view of the web page;

including a first object on the web page at a first desired position on the web page based on one or more first user inputs to the first user's computing device;

including a second object on the web page at a second desired position on the web page based on one or more first user inputs to the first user's computing device;

allowing a second user to access the web page from a second user's computing device;

displaying on the second user's computing device a view of the web page that includes the first object and the second object;

repositioning the first object on the web page based on one or more first user inputs to the first user's computing device;

updating the view of the web page displayed on the first user's computing device to reflect the repositioning of the first object on the web page;

updating the view of the web page displayed on the second user's computing device to reflect the repositioning of the first object on the web page, the updated view of the web page displayed on the second user's computing device not including the first object when the first object is repositioned to a region of the web page in which an authority level of the second user limits a viewing access by the second user's computing device with respect to any objects positioned in the region;

storing in a database information necessary to generate the first user's view of the web page on the first user's computing device; and altering the view of the web page displayed on one or both of the first user's computing device and the second user's computing device, such that at least one object appearing in the altered view of the web page visually indicates whether the at least one object was added to the web page before a predetermined date, before a predetermined time, or before the predetermined date and the predetermined time, based on respective meta data of each of the at least one object.

10. The method for persistent spatial collaboration on the internet of claim 9, wherein the first object is a text box.

11. The method for persistent spatial collaboration on the internet of claim 9, wherein the first object has an assigned first access level and the second object has an assigned second access level.

12. The method for persistent spatial collaboration on the internet of claim 9, wherein the first user and the second user are each assigned a respective authority level for the web page.

13. The method for persistent spatial collaboration on the internet of claim 9, further comprising:

including a third object on the web page at a third desired position on the web page based on one or more second user inputs to the second user's computing device;

updating the view of the web page displayed on the second user's computing device to include the third object; and updating the view of the web page displayed on the first user's computing device to include the third object.

14. The method for persistent spatial collaboration on the internet of claim 13, wherein the third object is included on the web page at the third desired position on the web page only if an authority level assigned to the second user for the web page provides the second user with a proper collaboration authority to add an object to the web page.

15. The method for persistent spatial collaboration on the internet of claim 13, wherein the first user's computing device employs a web browser and the second user's computing device employs a web browser, further comprising:

passing information regarding the inclusion of the third object on the web page from the web browser employed by the second user's computing device to a web service application server;

storing data from the information regarding the inclusion of the third object on the web page in a database;

using the web browser employed by the first user's computing device to periodically poll the web service application server to determine if a change has been made to the web page;

retrieving data regarding the inclusion of the third object on the web page from the database;

using the web service application server to forward information generated from the retrieved data to the web browser employed by the first user's computing device; and using the web browser employed by the first user's computing device to, based on the forwarded information, update the view of the web page displayed to the first user to include the third object.

16. A method for internet-hosted persistent spatial activity, the method comprising:

generating a web page based on one or more user inputs to a user's computing device;

displaying on the user's computing device a view of the web page;

displaying on a second user's computing device a view of the web page;

including, based on a first input to the user's computing device, a first object on the web page at a first desired position on the web page;

including, based on a second input to the user's computing device, a second object on the web page at a second desired position on the web page, the second desired position being included in a first region of the web page;

updating the view of the web page displayed on the user's computing device to include the first object and the second object on the web page;

storing in a database information necessary to generate the user's view of the web page on the user's computing device;

updating, based on the information stored in the database, the view of the web page displayed on the second user's computing device to include the first object, the second object not being included in the updated view of the web page displayed on the second user's computing device based on the second user having an authority level which limits viewing access by the second user's computing device with respect to any objects positioned in the first region;

repositioning the first object on the web page based on one or more user inputs to the user's computing device;

updating the view of the web page displayed on the user's computing device to reflect the repositioning of the first object on the web page;

storing in the database second information necessary to generate the user's view on the user's computing device of the web page after the repositioning of the first object; and updating the view of the web page displayed on the second user's computing device to reflect the repositioning of the first object on the web page, the updated view of the web page displayed on the second user's computing device not including the first object when the first object is repositioned to a region in which the authority level of the second user limits the viewing access by the second user's computing device with respect to any objects positioned in the region.

17. The method for internet-hosted persistent spatial activity of claim 16, further comprising altering the view of the web page displayed on the user's computing device based on one or more user inputs to the user's computing device, wherein the altered view is a zoomed-in view showing only a portion of the web page.

18. The method for internet-hosted persistent spatial activity of claim 16, wherein the user's computing device employs a web browser, further comprising:

passing information regarding the inclusion of the first object on the web page from the web browser employed by the user's computing device to a web service application server; and using the web service application server to store the information regarding the inclusion of the first object on the web page in the database.

19. The method for internet-hosted persistent spatial activity of claim 16, wherein the first object is a text box and the second text object is an audio/visual file.

20. The method for internet-hosted persistent spatial activity of claim 16, wherein the user's computing device employs a rich client, further comprising:

passing information regarding the inclusion of the first object on the web page from the rich client employed by the user's computing device to a web service application server; and using the web service application server to store the information regarding the inclusion of the first object on the web page in the database.

* * * * *